US012676985B2

(12) United States Patent
Kwong et al.

(10) Patent No.: US 12,676,985 B2
(45) Date of Patent: Jul. 7, 2026

(54) PROCESSING FOR ENCODING SCREEN CONTENT VIDEO USING BIT ALLOCATION

(71) Applicant: City University of Hong Kong, Kowloon (HK)

(72) Inventors: Sam Tak Wu Kwong, Kowloon (HK); Yi Chen, Kowloon (HK); Shiqi Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 71 days.

(21) Appl. No.: 17/964,305

(22) Filed: Oct. 12, 2022

(65) Prior Publication Data

US 2024/0137522 A1     Apr. 25, 2024

(51) Int. Cl.
*H04N 19/147* (2014.01)
*H04N 19/107* (2014.01)
*H04N 19/14* (2014.01)
*H04N 19/177* (2014.01)
*H04N 19/96* (2014.01)

(52) U.S. Cl.
CPC ......... *H04N 19/147* (2014.11); *H04N 19/107* (2014.11); *H04N 19/14* (2014.11); *H04N 19/177* (2014.11); *H04N 19/96* (2014.11)

(58) Field of Classification Search
None
See application file for complete search history.

(56) References Cited

U.S. PATENT DOCUMENTS

| | | |
|---|---|---|
| 6,831,947 B2 | 12/2004 | Ribas |
| 8,532,169 B2 | 9/2013 | Wang et al. |

| | | |
|---|---|---|
| 8,588,296 B2 | 11/2013 | Yang et al. |
| 8,885,702 B2 | 11/2014 | Yang et al. |
| 9,860,543 B2 | 1/2018 | Xu et al. |
| 10,542,262 B2 | 1/2020 | Gao et al. |
| 10,560,696 B2 | 2/2020 | Gao et al. |

(Continued)

FOREIGN PATENT DOCUMENTS

| | | |
|---|---|---|
| CN | 106416251 | 2/2017 |
| CN | 107113432 | 8/2017 |

OTHER PUBLICATIONS

Li et al. ["λ Domain Rate Control Algorithm for High Efficiency Video Coding", IEEE Transactions on Image Processing, vol. 23, No. 9, Sep. 2014].*

(Continued)

*Primary Examiner* — Edemio Navas, Jr.
(74) *Attorney, Agent, or Firm* — Renner, Kenner, Greive, Bobak, Taylor & Weber

(57)     ABSTRACT

A method for processing a screen content video. The screen content video includes a plurality of frames each including a plurality of coding tree units and a plurality of coding units in each of the coding tree units. The method includes performing a coding-tree-unit-based analysis operation on the screen content video to determine content information associated with the screen content video, and performing a rate control operation on the screen content video based on the determined content information to encoding of the screen content video. The content information includes content complexity information associated with the screen content video and temporal importance information associated with the screen content video.

22 Claims, 8 Drawing Sheets

Frame number in encoding order

(56) References Cited

U.S. PATENT DOCUMENTS

| | | | | |
|---|---|---|---|---|
| 11,025,914 | B1* | 6/2021 | Yuen | H04N 19/149 |
| 11,736,704 | B1* | 8/2023 | Chuang | H04N 19/42 |
| | | | | 375/240.26 |
| 11,778,224 | B1* | 10/2023 | Vanam | H04N 19/14 |
| | | | | 375/240.12 |
| 2005/0175090 | A1* | 8/2005 | Vetro | H04N 19/176 |
| | | | | 375/240.03 |
| 2009/0086816 | A1* | 4/2009 | Leontaris | H04N 19/80 |
| | | | | 375/E7.193 |
| 2012/0147958 | A1* | 6/2012 | Ronca | H04N 19/14 |
| | | | | 375/240.24 |
| 2020/0029093 | A1* | 1/2020 | Zhou | H04N 19/96 |
| 2020/0128242 | A1* | 4/2020 | Aristarkhov | H04N 19/14 |
| 2020/0275104 | A1* | 8/2020 | Zhao | H04N 19/174 |
| 2021/0044805 | A1* | 2/2021 | Liu | H04N 19/146 |
| 2022/0038690 | A1* | 2/2022 | Sharman | H04N 19/17 |
| 2022/0150509 | A1* | 5/2022 | Rosewarne | H04N 19/176 |
| 2023/0370608 | A1* | 11/2023 | Chen | H04N 19/177 |

OTHER PUBLICATIONS

He et al. ("He") ("Adaptive Quantization Parameter Selection For H.265/HEVC by Employing Inter-Frame Dependency,"—IEEE Transactions On Circuits and Systems For Video Technology, vol. 28, No. 12, Dec. 2018).*

T. Nguyen, X. Xu, F. Henry, R.-L. Liao, M. Sarwer, M. Karczewicz, Y.-H. Chao, J. Xu, S. Liu, D. Marpe, G. J. Sullivan, Overview of the screen content support in vvc: Applications, coding tools, and performance, IEEE Transactions on Circuits and Systems for Video Technology (2021) 1-1doi:10.1109/TCSVT.2021.3074312.

B. Bross, Y.-K. Wang, Y. Ye, S. Liu, J. Chen, G. J. Sullivan, J.-R. Ohm, Overview of the versatile video coding (vvc) standard and its applications, IEEE Transactions on Circuits and Systems for Video Technology 31 (10) (2021) 3736-3764.

G. J. Sullivan, J.-R. Ohm, W.-J. Han, T. Wiegand, Overview of the high efficiency video coding (hevc) standard, IEEE Transactions on circuits and systems for video technology 22 (12) (2012) 1649-1668.

X. Xu, S. Liu, T.-D. Chuang, Y.-W. Huang, S.-M. Lei, K. Rapaka, C. Pang, V. Seregin, Y.-K. Wang, M. Karczewicz, Intra block copy in hevc screen content coding extensions, IEEE Journal on Emerging and Selected Topics in Circuits and Systems 6 (4) (2016) 409-419. doi:10.1109/JETCAS.2016.2597645.

W. Pu, M. Karczewicz, R. Joshi, V. Seregin, F. Zou, J. Sole, Y.-C. Sun, T.-D. Chuang, P. Lai, S. Liu, S.-T. Hsiang, J. Ye, Y.-W. Huang, Palette mode coding in hevc screen content coding extension, IEEE Journal on Emerging and Selected Topics in Circuits and Systems 6 (4) (2016) 420-432. doi:10.1109/JETCAS.2016.2605661.

L. L. Zhang, X. Xiu, J. Chen, M. Karczewicz, Y. He, Y. Ye, J. Xu, J. Sole, W.-S. Kim, Adaptive color-space transform in hevc screen content coding, IEEE Journal on Emerging and Selected Topics in Circuits and Systems 6 (4) (2016) 446-459. doi:10.1109/JETCAS.2016.2599860.

T. Nguyen, B. Bross, H. Schwarz, D. Marpe, T. Wiegand, Residual coding for transform skip mode in versatile video coding, in: 2020 Data Compression Conference (DCC), 2020, pp. 83-92. doi:10.1109/DCC47342.2020.00016.

M. Abdoli, F. Henry, P. Brault, F. Dufaux, P. Duhamel, P. Philippe, Intra block-dpcm with layer separation of screen content in vvc, in: 2019 IEEE International Conference on Image Processing (ICIP), 2019, pp. 3162-3166. doi:10.1109/ICIP.2019.8803389.

L. Wang, Rate control for mpeg video coding, Signal Processing: Image Communication 15 (6) (2000) 493-511.

ITUTH, Generic coding of moving pictures and associated audio information: Video, Recommendation (1995).

J.-C. Tsai, C.-H. Shieh, Modified tmn8 rate control for low-delay video communications, IEEE transactions on circuits and systems for video technology 14 (6) (2004) 864-868.

K. Rijkse, H. 263: Video coding for low-bit-rate communication, IEEE Communications magazine 34 (12) (1996)42-45.

J. I. Ronda, M. Eckert, F. Jaureguizar, N. Garcia, Rate control and bit allocation for mpeg-4, IEEE Transactions on Circuits and Systems for Video Technology 9 (8) (1999) 1243-1258.

T. Ebrahimi, Mpeg-4 video verification model: A video encod-ing/decoding algorithm based on content representation, Signal Processing: Image Communication 9 (4) (1997) 367-384.

Z. Li, Adaptive basic unit layer rate control for jvt, JVT 7th Meeting (2003).

I. Recommendation, H. 264: Advanced video coding for generic audio-visual services, ISO/IEC 14496 (2003).

B. Li, H. Li, L. Li, J. Zhang, $\lambda$ domain rate control algorithm for high efficiency video coding, IEEE transactions on Image Processing 23 (9) (2014) 3841-3854.

S. Ma, W. Gao, Y. Lu, Rate-distortion analysis for h. 264/avc video coding and its application to rate control, IEEE transactions on circuits and systems for video technology 15 (12) (2005) 1533-1544.

Z. He, Y. K. Kim, S. K. Mitra, Low-delay rate control for dct video coding via/spl rho/-domain source modeling, IEEE transactions on Circuits and Systems for Video Technology 11 (8) (2001) 928-940.

M. Liu, Y. Guo, H. Li, C. W. Chen, Low-complexity rate control based on $\rho$-domain model for scalable video coding, in: 2010 IEEE International Conference on Image Processing, IEEE, 2010, pp. 1277-1280.

L. Li, B. Li, H. Li, C. W. Chen, $\lambda$-domain optimal bit allocation algorithm for high efficiency video coding, IEEE Transactions on Circuits and Systems for Video Technology 28 (1) (2016) 130-142.

Y. Li, B. Li, D. Liu, Z. Chen, A convolutional neural network-based approach to rate control in hevc intra coding, in: 2017 IEEE Visual Communications and Image Processing (VCIP), IEEE, 2017, pp. 1-4.

M. Wang, J. Zhang, L. Huang, J. Xiong, Machine learning-based rate distortion modeling for vvc/h. 266 intra-frame, in: 2021 IEEE International Conference on Multimedia and Expo (ICME), IEEE, 2021, pp. 1-6.

W. Gao, S. Kwong, Q. Jiang, C.-K. Fong, P. H. Wong, W. Y. Yuen, Data-driven rate control for rate-distortion optimization in hevc based on simplified effective initial qp learning, IEEE Transactions on Broad-casting 65 (1) (2018) 94-108.

S. Wang, X. Zhang, X. Liu, J. Zhang, S. Ma, W. Gao, Utility-driven adaptive preprocessing for screen content video compression, IEEE Transactions on Multimedia 19 (3) (2016) 660-667.

S. Wang, K. Gu, K. Zeng, Z. Wang, W. Lin, Objective quality assessment and perceptual compression of screen content images, IEEE computer graphics and applications 38 (1) (2016) 47-58.

S. Wang, J. Li, S. Wang, S. Ma, W. Gao, A frame level rate control algorithm for screen content coding, in: 2018 IEEE International Symposium on Circuits and Systems (ISCAS), IEEE, 2018, pp. 1-4.

Y. Guo, B. Li, S. Sun, J. Xu, Rate control for screen content coding in hevc, in: 2015 IEEE International Symposium on Circuits and Systems (ISCAS), IEEE, 2015, pp. 1118-1121.

J. Xiao, B. Li, S. Sun, J. Xu, Rate control with delay constraint for screen content coding, in: 2017 IEEE Visual Communications and Image Processing (VCIP), IEEE, 2017, pp. 1-4.

Y. Yang, L. Shen, H. Yang, P. An, A content-based rate control algorithm for screen content video coding, Journal of Visual Communication and Image Representation 60 (2019) 328-338.

H. Yang, L. Shen, Y. Yang, W. Lin, A novel rate control scheme for video coding in hevc-scc, IEEE Transactions on Broadcasting 66 (2) (2019) 333-345.

J. Garrett-Glaser, A novel macroblock-tree algorithm for high-performance optimization of dependent video coding in h.264/avc, Tech. Rep. (2009).

J. Si, S. Ma, X. Zhang, W. Gao, Adaptive rate control for high efficiency video coding, in: 2012 Visual Communications and Image Processing, IEEE, 2012, pp. 1-6.

J. He, E.-H. Yang, F. Yang, K. Yang, Adaptive quantization parameter selection for h. 265/hevc by employing inter-frame dependency, IEEE Transactions on Circuits and Systems for Video Technology 28 (12) (2017) 3424-3436.

(56)     References Cited

OTHER PUBLICATIONS

Z. Liu, L. Wang, X. Li, X. Ji, Optimize x265 rate control: An exploration of lookahead in frame bit allocation and slice type decision, IEEE Transactions on Image Processing 28 (5) (2018) 2558-2573.

J. Chen, Y. Ye, S. Kim, Algorithm description for Versatile Video Coding and Test Model 9 (VTM 9), Joint Video Experts Team (JVET), doc. JVET-R2002 (2020).

B. Widrow, M. E. Hoff, Adaptive switching circuits, Tech. rep., Stanford Univ Ca Stanford Electronics Labs (1960).

F. Bossen, J. Boyce, X. Li, V. Seregin, K. Suehring, JVET common test conditions and software reference configurations for SDR video, Joint Video Experts Team (JVET), doc. JVET-N1010 (2019).

G. Bjontegaard, Calculation of average PSNR differences between RD-curves, ITU-T VCEG Meeting, Austin, Texas, USA, Tech. Rep, doc. VCEG-M33 (2001).

* cited by examiner

PROCESSING FOR ENCODING SCREEN CONTENT VIDEO USING BIT ALLOCATION

TECHNICAL FIELD

This invention relates to processing and encoding of videos, in particular screen content videos.

BACKGROUND

With the prevalence of digital devices, screen content (i.e., non-camera-captured signals/content) has become an increasingly popular medium for conveying visual information. Screen content videos and camera-acquired natural scene content videos typically possess different characteristics as they are from different origins. Specifically, screen content videos are usually generated or rendered by a computer without sensor noises injected, hence they can exhibit higher contrast, sharper edges, and more regulated textures. As a result, the coding and processing of screen content videos are different from those of natural scene content videos.

Versatile Video Coding (VVC) is the latest video coding standard developed by the Joint Video Experts Team (JVET) of the ITU-T Video Coding Experts Group (VCEG) and the ISO/IEC Moving Picture Experts Group (MPEG). VVC employs the classical block-based hybrid coding framework, which cooperates the intra prediction, inter prediction, transformation, quantization, entropy coding, and loop filtering to remove redundancies in versatile video contents. Compared to previous coding standards such as the High Efficiency Video Coding (HEVC), in VVC, many coding tools are enhanced and a series of new coding technologies are introduced. In some applications, compared with HEVC, VVC can achieve around 50% bitrate savings and with a similar visual quality. Moreover, in VVC, a variety of coding tools are designed for screen content videos. Examples of these tools include:

- Intra block copy (IBC), as disclosed, e.g., in Xu et al., *Intra block copy in HEVC screen content coding extensions, IEEE Journal on Emerging and Selected Topics in Circuits and Systems* 6 (4)(2016) 409-419
- Palette mode, as disclosed, e.g., in Pu et al., *Palette mode coding in HEVC screen content coding extension, IEEE Journal on Emerging and Selected Topics in Circuits and Systems* 6 (4)(2016) 420-432,
- Adaptive Color Transform (ACT), as disclosed, e.g., in Zhang et al., *Adaptive color-space transform in HEVC screen content coding, IEEE Journal on Emerging and Selected Topics in Circuits and Systems* 6(4)(2016) 446-459
- Transform Skip with Residual Coding (TSRC), as disclosed, e.g., in Nguyen et al., *Residual coding for transform skip mode in versatile video coding,* 2020 *Data Compression Conference (DCC),* 2020, pp. 83-92
- Block-based Differential Pulse-Coded Modulation (BDPCM), as disclosed, e.g., in Abdoli et al., *Intra block-DPCM with layer separation of screen content in WC,* 2019 *IEEE International Conference on Image Processing (ICIP),* 2019, pp. 3162-3166

These tools can reduce or eliminate spatial or temporal redundancies for screen content videos. For coding units (CU) with repeated content, a more precise prediction may be achieved by using the intra block copy method, in which the current content could be predicted by referring to the reconstructed regions within the same frame.

Rate control often plays an important role in video coding optimization, especially in real-world application scenarios. Generally, the goal of rate control is to ensure that the coding bitrate is close to the target bitrate while satisfying the demand of transmission bandwidth and maintaining the rate-distortion (RD) performance as good as possible. In one example, the optimization problem of rate control can be formulated as:

$$P_{opt} = \arg \min_{P} D(P) \text{ s.t. } R(P) \le R_t \tag{1}$$

where P is the coding parameter set that may contain the quantization parameter (QP), coding modes, and the Lagrangian multiplier $\lambda$ for each individual coding unit; D(P) and R(P) represent the compression distortion and rate when coded with P, respectively, with the distortion generally measured by mean square error (MSE); and $R_t$ is the target bits.

Different rate control methods have been adopted in reference software of different coding standards. Examples of these methods include:

- TM5 rate control scheme for MPEG-2, as disclosed, e.g., in Wang, *Rate control for MPEG video coding, Signal Processing: Image Communication* 15 (6)(2000) 493-511
- TMN8 rate control scheme for H.263, as disclosed, e.g., in Tsai et al., *Modified TMN8 rate control for low-delay video communications, IEEE transactions on circuits and systems for video technology* 14 (6)(2004) 864-868
- VM8 rate control scheme for MPEG-4, as disclosed, e.g., in Ronda et al., *Rate control and bit allocation for MPEG-4, IEEE Transactions on Circuits and Systems for Video Technology* 9 (8)(1999) 1243-1258
- Quadratic model for H.264, as disclosed, e.g., in Li, *Adaptive basic unit layer rate control for JVT, JVT 7th Meeting* (2003)
- R-$\lambda$ model for H.265/HEVC, as disclosed, e.g., in Li et al., $\lambda$ *domain rate control algorithm for high efficiency video coding, IEEE transactions on Image Processing* 23 (9)(2014) 3841-3854

Rate control typically involves two stages. The first stage is bit allocation, in which bits are allocated to each individual frame or coding tree unit (CTU) according to historical coding statistics and/or video content characteristics. The second stage is parameter derivation, which could be achieved by adjusting coding parameters according to the allocated coding bits. For example, quantization parameter(s) and Lagrangian multiplier(s) $\lambda$ can be derived from the allocated bits and can be further used in the mode decision and quantization.

Efforts have also been devoted to modeling the rate and distortion relationship. These efforts can be roughly classified into three categories. The first category is based on Q-domain model, which manipulates the quantization parameter to adjust the rate or distortion behavior. An example is disclosed in Ma et al., *Rate-distortion analysis for h.264/AVC video coding and its application to rate control, IEEE transactions on circuits and systems for video technology* 15 (12)(2005) 1533-1544. Typically, the bits assigned to each frame are calculated according to predefined principles such as the buffer status, averaged bits per frame, and frame-level complexity. The second category concentrates on the rate and distortion modeling in the p-domain, in which p is the percentage of zero coefficients among the quantized transform coefficients. Some examples are disclosed in He et al., *Low-delay rate control for DCT video coding via/spl rho/-domain source modeling, IEEE transactions on Circuits and Systems for Video Technology* 11(8)(2001) 928-940 and Liu et al., *Low-complexity rate control based on p-domain model for scalable video coding,* 2010 *IEEE International Conference on Image Processing, IEEE,* 2010, *pp.* 1277-1280. Generally, to achieve rate control in p-domain, the relationships of R-p and Q-p are analyzed and derived. The third category achieves rate control with λ-domain model, in which the distortion (D) and rate (R) are modelled as hyperbolic functions of the Lagrangian multiplier λ. Some examples are disclosed in Li et al., *λ domain rate control algorithm for high efficiency video coding, IEEE transactions on Image Processing* 23 (9)(2014) 3841-3854 and Li et al., *λ-domain optimal bit allocation algorithm for high efficiency video coding, IEEE Transactions on Circuits and Systems for Video Technology* 28 (1)(2016) 130-142. By utilizing the λ-domain model, the rate-distortion (RD) relationship can be predicted with high accuracy. One advantage of the λ-domain model is that optimal bit allocation can be achieved by adjusting the Lagrange multiplier λ when the λ for each frame within one group of pictures (GOP) equals to the group of pictures level λ. Apart from these categories, learning-based methods have also been explored. For example, in Li et al., *A convolutional neural network-based approach to rate control in HEVC intra coding,* 2017 *IEEE Visual Communications and Image Processing* (*VCIP*), *IEEE,* 2017, *pp.* 1-4, a convolutional neural network is trained to estimate the model parameters for λ-domain rate-distortion (RD) modeling, which could be further used for all-intra coding. For example, in Wang et al., *Machine learning-based rate distortion modeling for VVC/ h.* 266 *intra-frame,* 2021 *IEEE International Conference on Multimedia and Expo* (*ICME*), *IEEE,* 2021, *pp.* 1-6, a machine-learning-based model is proposed with selected features to replace the existing analytical models in all-intra coding. For example, in Gao et al., *Data-driven rate control for rate-distortion optimization in HEVC based on simplified effective initial QP learning, IEEE Transactions on Broadcasting* 65 (1)(2018) 94-108, a learning-based method is used for initial quantization parameter prediction.

Compared to natural scene videos, the distinct characteristics of screen content videos are attributed to their spatial and temporal domain unnaturalness. Regarding the spatial domain characteristics, for screen content videos, the residual distribution may exhibit high contrast due to complex areas such as text regions. Also, for screen content videos, in homogeneous regions, pixels may share identical intensities. In natural scene videos, the spatial content typically follows the natural scene statistics governed by the typical 1/f power-law. However, such characteristics cannot be guaranteed for screen content videos. Regarding the temporal domain unnaturalness, for screen content videos, the coding of residuals, determined by the comparisons between to-be-coded and reference frames, may suffer from frequently encountered scene changes. Also, for screen content videos, for scenes with dramatic movements such as scrolling the slides, the coding of motion vectors may consume a large number of bits. In contrast, in natural scene videos, the movements of objects follow the regular statistics and are relatively smooth. Therefore, the unique characteristics of screen content videos bring unique challenges for rate control.

While some approaches have been proposed to regulate the coding bits in different video codecs, there remains a need to provide ways to facilitate or perform screen content rate control. It is noted that directly employing existing rate control algorithms for natural scene videos to screen content videos may result in unexpected loss in terms of rate-distortion performance and control accuracy, as the rate control model can be highly dependent on the content characteristics.

SUMMARY OF THE INVENTION

It is an object of some embodiments of the invention to address one or more of the above needs. It is an object of some embodiments of the invention to reduce the effect of, to overcome, or to substantially ameliorate one or more of the above disadvantages. It is an object of some embodiments of the invention to provide an alternative or improved system/method for processing and encoding screen content videos. One or more embodiments of the invention may include alternative or additional object(s).

In a first aspect, there is provided a method for processing a screen content video. The screen content video comprises a plurality of frames each including a plurality of coding tree units (CTUs) and a plurality of coding units in each of the coding tree units. The method includes performing a coding-tree-unit-based analysis operation on the screen content video to determine content information associated with the screen content video, and performing a rate control operation on the screen content video based on the determined content information to facilitate encoding of the screen content video. The content information includes content complexity information associated with the screen content video and temporal importance information associated with the screen content video.

Optionally, the content complexity information associated with the screen content video comprises content complexity measures for each of the coding units.

Optionally, the temporal importance information comprises temporal importance measures for each of the coding units.

Optionally, the coding-tree-unit-based analysis operation comprises: processing the screen content video to perform inter prediction, intra prediction, and intra block copy prediction.

Optionally, the coding-tree-unit-based analysis operation comprises: determining the content complexity measures based on Hadamard transform of residuals of the intra prediction, the inter prediction, and/or the intra block copy prediction.

Optionally, the content complexity measures are based on:

$$C = \frac{\sum_k |HAD_k|}{W \cdot H},$$

where C denotes a content complexity measure, $HAD_k$ denotes a sample of Hadamard-transformed prediction residual at position k within a coding unit, W and H are width and height of a corresponding one of the frame.

Optionally, the coding-tree-unit-based analysis operation comprises: determining the temporal importance measures based on a recursive propagation process.

Optionally, the determining of the temporal importance measures based on the recursive propagation process takes into account the content complexity measures associated with the coding units.

Optionally, the performing of the rate control operation on the screen content video is further based on rate and distortion models.

Optionally, the rate and distortion models comprise one or more rate models and one or more distortion models.

Optionally, each of the one or more rate models is modelled based on $R=\alpha \cdot C^{\beta} \cdot QS^{\gamma}$, where R is rate, C is content complexity measure, QS is quantization stepsize, and $\alpha$, $\beta$, $\gamma$ are model parameters.

Optionally, each of the one or more distortion models is modelled based on $=\mu \cdot C^{\eta} \cdot QS^{\eta}$, where D is distortion, C is content complexity measure, QS is quantization stepsize, and $\mu$, $\eta$, $\epsilon$ are model parameters.

Optionally, the one or more rate models comprise a frame-level rate model and a coding-tree-unit-level rate model.

Optionally, the one or more distortion models comprises a frame-level distortion model and a coding-tree-unit-level distortion model.

Optionally, the frame-level rate model and the coding-tree-unit-level rate model are each modelled based on $R=\alpha \cdot C^{\beta} \cdot QS^{\gamma}$, where R is rate, C is content complexity measure, QS is quantization stepsize, and $\alpha$, $\beta$, $\gamma$ are model parameters.

Optionally, the frame-level distortion model and the coding-tree-unit-level distortion model are each modelled based on $=\mu \cdot C^{\eta} \cdot QS^{\epsilon}$, where D is distortion, C is content complexity measure, QS is quantization stepsize, and $\mu$, $\eta$, $\epsilon$ are model parameters.

Optionally, the rate control operation comprises: performing group-of-pictures-level bit allocation; performing frame-level bit allocation; and performing coding-tree-unit-level bit allocation.

Optionally, the rate control operation further comprises: determining coding parameters associated with each of the frames based on the allocated bits obtained in the frame-level bit allocation and the rate and distortion models; and determining coding parameters associated with each of the coding tree units based on the allocated bits obtained in the coding-tree-unit-level bit allocation and the rate and distortion models.

Optionally, the coding parameters associated with each of the frames comprise quantization parameters and Lagrangian multipliers A associated with the frames.

Optionally, the coding parameters associated with each of the coding tree units comprise quantization parameters and Lagrangian multipliers A associated with each of the coding tree units.

Optionally, the Lagrangian multipliers A associated with the frames are determined based on $$\lambda = x \cdot C^{y} QS^{z}, \text{ where } x = -\frac{\mu\epsilon}{\alpha\gamma}, y = \eta - \beta, z = \epsilon - \gamma.$$

Optionally, the Lagrangian multipliers A associated with each of the coding tree units are determined based on $$\lambda = x \cdot C^{y} QS^{z}, \text{ where } x = -\frac{\mu\epsilon}{\alpha\gamma}, y = \eta - \beta, z = \epsilon - \gamma.$$

Optionally, the method further comprises: encoding each of the frames and/or each of the coding tree units of the screen content video based on the rate control operation to facilitate generation of a bitstream of the screen content video.

Optionally, the method further comprises: updating the model parameters in the rate and distortion models after encoding of each of the frames and/or each of the coding tree units.

In a second aspect, there is provided a system for processing a screen content video. The screen content video is comprises a plurality of frames each including a plurality of coding tree units and a plurality of coding units in each of the coding tree units. The system comprising: one or more processors and memory storing one or more programs configured to be executed by the one or more processors. The one or more programs including instructions for performing or facilitating performing of the method of the first aspect.

In a third aspect, there is provided a non-transitory computer-readable storage medium storing one or more programs configured to be executed by one or more processors. The one or more programs including instructions for processing a screen content video. The screen content video comprises a plurality of frames each including a plurality of coding tree units and a plurality of coding units in each of the coding tree units. The instructions for processing a screen content video comprise instructions for performing or facilitating performing of the method of the first aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which.

DETAILED DESCRIPTION

Figure 1:
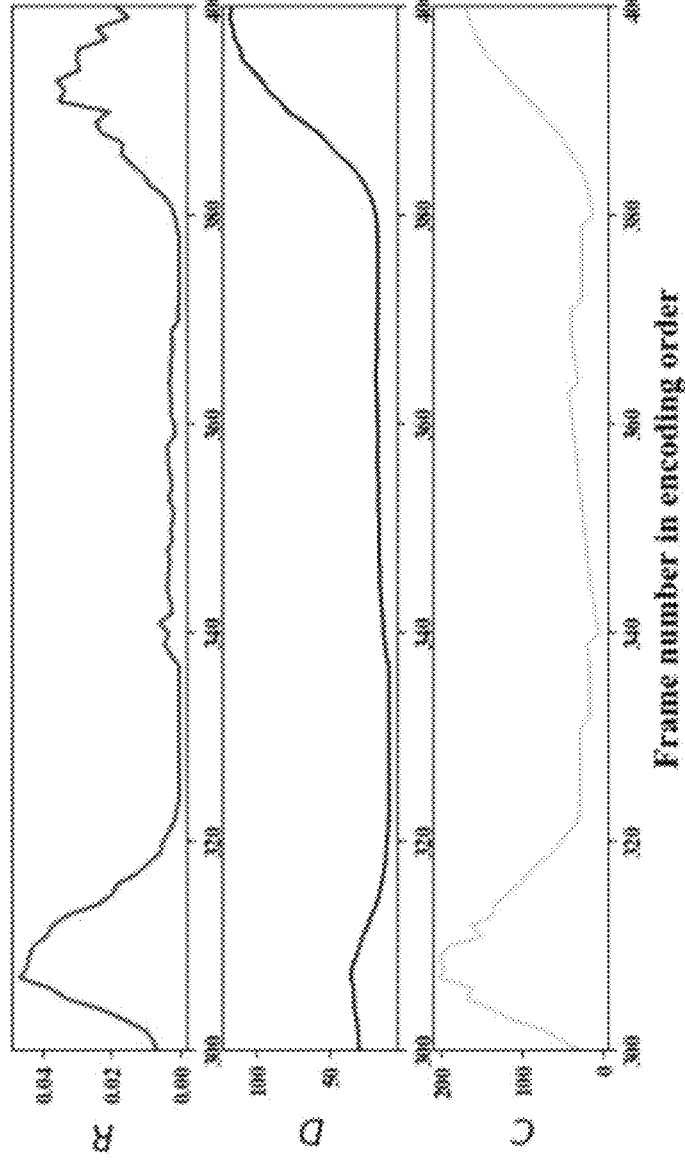
FIG. 1 is a graph showing variation of rate (R), distortion (D), and complexity (C) frames in video sequence Slide-Show coded with a constant quantization parameter in one example.

This invention generally relates to processing a screen content video. The screen content video comprises multiple frames each including multiple coding tree units (CTUs) and multiple coding units in each of the coding tree units. The processing includes, at least, performing a coding-tree-unit-based analysis operation on the screen content video to determine content information associated with the screen content video, and performing a rate control operation on the screen content video based on the determined content information to facilitate encoding of the screen content video. The content information includes content complexity information associated with the screen content video and temporal importance information associated with the screen content video. The following description provides some example embodiments of the invention.

In some embodiments of the invention, there is provided a screen content (video) rate control scheme with optimal bit allocation for VVC screen content coding, in which the spatial and temporal information of each individual frame and coding tree unit are jointly considered. In some embodiments of the invention, the content information is further incorporated into the rate and distortion models. In some embodiments of the invention, the temporal referencing relationship is analyzed through the recursive propagation process with the coding-tree-unit-based pre-analysis, which reflects the importance of each frame and coding tree unit in the group of pictures. These embodiments of the invention may improve compression performance and bitrate accuracy with only a moderate increase in encoding complexity. In some embodiments of the invention, there is provided a rate control scheme at frame-level and coding-tree-unit-level for VVC screen content coding, based on the pre-encoding analysis and rate-distortion modeling, which leads to improved compression performance for screen content video coding under low-delay configuration. In some embodiments of the invention, there is provided an advanced coding-tree-unit-based pre-encoding analysis strategy that can seamlessly collaborate with the screen content characteristics. In particular, the screen content coding tools (e.g., intra block copy (IBC) prediction) can be incorporated in the pre-encoding analysis stage so that the spatial and temporal referencing relationship could be more effectively captured for each individual frame and coding tree unit. In some embodiments of the invention, there is provided an efficient bit allocation scheme based on the pre-encoding analysis outcomes, such that the temporal dependency and content complexity can be jointly considered in improving the control accuracy.

Inventors of the invention have devised and appreciated, through research, experiments, and/or trials, various aspects and features concerning screen content coding in VVC. Specifically, screen content is becoming increasingly common due to the ubiquitous digital devices and remote services. The emergence of video-driven applications such as online education, virtual meeting, and cloud gaming brings unprecedented challenges to the screen content coding. In VVC, five coding tools are specifically involved in improving the compression performance of the screen content compression, as disclosed in Nguyen, *Overview of the screen content support in WC: Applications, coding tools, and performance, IEEE Transactions on Circuits and Systems for Video Technology* (2021). These tools include the intra block copy, > Intra block copy (IBC) as disclosed, e.g., in Xu et al., *Intra block copy in HEVC screen content coding extensions, IEEE Journal on Emerging and Selected Topics in Circuits and Systems* 6 (4)(2016) 409-419
>
> Palette mode as disclosed, e.g., in Pu et al., *Palette mode coding in HEVC screen content coding extension, IEEE Journal on Emerging and Selected Topics in Circuits and Systems* 6 (4)(2016) 420-432,
>
> Adaptive Color Transform (ACT) as disclosed, e.g., in Zhang et al., *Adaptive color-space transform in HEVC screen content coding, IEEE Journal on Emerging and Selected Topics in Circuits and Systems* 6(4)(2016) 446-459
>
> Transform Skip with Residual Coding (TSRC) as disclosed, e.g., in Nguyen et al., *Residual coding for transform skip mode in versatile video coding,* 2020 *Data Compression Conference (DCC),* 2020, pp. 83-92
>
> Block-based Differential Pulse-Coded Modulation (BDPCM) as disclosed, e.g., in Abdoli et al., *Intra block-DPCM with layer separation of screen content in VVC,* 2019 *IEEE International Conference on Image Processing (ICIP),* 2019, pp. 3162-3166

Inventors of the invention have devised and appreciated, through research, experiments, and/or trials, that intra block copy (IBC), also termed as the current picture reference (CPR), is a coding-unit-level coding mode, which treats the reconstructed regions within the current frame as the reference and aims at predicting the current coding unit with a similar reference. Due to on-chip memory restriction, only the nearest reconstructed areas could be accessed as the reference region. The displacement between the current coding unit and reference block is denoted as the block vector, which is further coded into bitstream in analogous to the motion vector. Local blocks of screen content may contain a limited number of colors. Palette mode is introduced to encode samples by enumerating colors. Palette mode could outperform the conventional prediction-then-transform compression paradigm for such specific content. ACT coding can be applied to spatial residuals before the forward transform, which provides an adaptive color space conversion, catering to the high bit-rate coding scenarios with RGB input signals. BDPCM in VVC can be considered as an intra prediction mode which inherits the rationality of the residual DPCM in HEVC RExt. Sample-wise prediction and reconstruction can be applied horizontally or vertically with the BDPCM. Transform skip is involved in screen content compression, cooperating with delicate residual coding to enhance the compression performance. The processing order regarding the scanning order is converted as forward diagonal scan order in VVC, and the syntax coding, coefficient level coding, as well as the context modelling have also been adjusted accordingly.

Inventors of the invention have devised and appreciated, through research, experiments, and/or trials, various aspects and features concerning rate control for screen content video coding. Specifically, the characterization of motion variety and content diversity can be challenging in screen content rate control. Inventors of the invention have appreciated that some approaches have been proposed to address this issue. For example, in Wang et al., *A frame level rate control algorithm for screen content coding*, 2018 *IEEE International Symposium on Circuits and Systems (ISCAS), IEEE,* 2018, pp. 1-4, the percentage of static blocks is computed for analyzing the inter-frame correlation, based on which the key frames and non-key frames could be successfully discriminated to guide bit allocation. For example, in Ma et al., *Rate-distortion analysis for h.264/AVC video coding and its application to rate control, IEEE transactions on circuits and systems for video technology* 15 (12)(2005) 1533-1544, different weights are assigned to key frames and non-key frames while the Q-domain model is employed to derive the coding parameter. Moreover, buffer status is considered where the frame-level bit assignment is achieved according to the remaining bit budget, consumed bits, as well as the overflow status. For example, in Guo et al., *Rate control for screen content coding in HEVC*, 2015 *IEEE International Symposium on Circuits and Systems (ISCAS), IEEE,* 2015, pp. 1118-1121, pre-encoding analysis is conducted with the frames in the to-be-coded group of pictures, and the inter prediction errors are collected as a complexity term, which could further guide the frame-level bit assignment. In addition, abrupt frames are detected and allocated with more coding bits. The coding-tree-unit-level bit allocation is performed following a similar principle, and the coding parameters are derived with a λ-domain model. For example, in Xiao et al., *Rate control with delay constraint for screen content coding*, 2017 *IEEE Visual Communications and Image Processing (VCIP), IEEE,* 2017, pp. 1-4, the screen content rate control scheme is further improved by cooperating with the buffer-status management. For example, in Yang et al., *A content-based rate control algorithm for screen content video coding, Journal of Visual Communication and Image Representation* 60 (2019) 328-338, a texture complexity measurement is adopted to classify coding tree units into textual coding tree units, screen coding tree units and natural coding tree units. Moreover, the frames are further categorized into scene-changed frames and scene-static frames. Bits are separately allocated to each type of coding tree unit and frame, collaborating with separate λ-domain models for quantization parameter and λ calculation. For example, in Yang et al., *A novel rate control scheme for video coding in HEVC-SCC, IEEE Transactions on Broadcasting* 66 (2)(2019) 333-345, frame-level bit allocation is improved based on the pre-encoding analyzed distortions. In particular, a frame-level linear relationship between the number of coded bits and distortion is investigated in the pre-analyzing stage. Subsequently, frame-level bit allocation is proposed by considering the distortion weights in the to-be-coded group of pictures.

Inventors of the invention have further devised and appreciated, through research, experiments, and/or trials, various aspects and features concerning coding tree unit based methods. Specifically, coding tree unit, which inherits the concept of MB-Tree in x264 as disclosed, e.g., in Garrett-Glaser, *A novel macroblock-tree algorithm for high-performance optimization of dependent video coding in h.264/AVC, Tech. Rep.* 2009, refers to the pre-encoding analysis process with which the rate-distortion behavior and content characteristics could be pre-determined (prior to encoding). As such, the encoder can more precisely determine coding parameters and allocate coding bits in advance, and as a result compression performance can be improved. The principle is that the frames or coding units frequently referenced are eligible to be coded with higher quality while the less important frames or coding units from the perspective of temporal referencing may be neutrally compressed. Inventors of the invention have appreciated that compared to the genuine coding process, the coding tree unit only conducts simplified predictions and transforms when gathering coding information, considering the overhead of computational complexity. Also, most of the coding tools are excluded from the pre-encoding analysis stage. Subsequently, the residuals for each individual coding unit are collected, which are further used for importance evaluation, to adjust the frame-level or block-level coding parameters, such as the quantization parameter. Regarding hierarchical video coding, both spatial and temporal characteristics may be considered. In particular, the coding tree unit interprets the spatial and temporal characteristics with residuals analysis wherein simplified predictions and Hadamard transform are employed in generating residuals. For each coding unit, the spatial complexity is measured with the Hadamard-transformed residual of intra prediction. Analogously, the temporal complexity can be obtained by looking-ahead multiple frames with temporal referencing. The coding parameters for each individual coding tree unit can be derived accordingly, leading to improvement of the compression performance.

Rate and Distortion Models

Inventors of the invention have appreciated that accurate rate and distortion models are important for both bit allocation and coding parameter derivation. In the following embodiments of the invention, prominent factors that influence the rate and distortion behaviors in the screen content coding are investigated, and scene complexity is incorporated into the rate and distortion modeling with the consideration of trade-off between model accuracy and computational complexity. In one embodiment, the average sum of absolute transformed differences (SATD) is used to measure the content complexity with prediction residuals, and the relationships among rate, distortion, content complexity, and quantization step (QS) are explored to model the coding behavior of VVC. The effectiveness of the rate and distortion models in these embodiments of the invention are validated by evaluating their accuracy against an existing R-λ model as disclosed in Li et al., *λ domain rate control algorithm for high efficiency video coding, IEEE transactions on Image Processing* 23 (9) (2014) 3841-3854. Besides, the relationship among $\lambda$, averaged SATD, and quantization step is developed, and is further used for effective bit allocation.

The rate and distortion relationships for intra frame and inter frame are studied. In this example, quantization parameters ranging from 17 to 42 are involved in encoding, in order to cover a relatively wide range of bitrates. The first two frames from screen-content sequences are used for analysis. All-intra configuration is used when collecting intra frame information. Analogously, when analyzing the rate and distortion relationship of inter frames, the first frame is intra coded and the second frame is coded as inter frame. The rate is measured with bit-per-pixel (bpp). The coding distortion is derived from the mean square error (MSE) between the original frame and the reconstructed frame. The content complexity (C) is reflected with the Hadamard transform of the residuals of intra or inter prediction in the pre-encoding analysis process, which can be derived as:

$$C = \frac{\Sigma_k |HAD_k|}{W \cdot H} \tag{2}$$

where $HAD_k$ denotes the sample of Hadamard-transformed prediction residual at position k within a coding unit obtained from the pre-analysis, and W and H are the width and height of the frame.

In these embodiments, the rate (R) and distortion (D) models are governed by the content complexity (C) and quantization parameter (QP). Generally, with the increase of the quantization parameter, fewer bits are consumed and more distortions are induced. Also, when quantization parameter is fixed, the coding bits and distortion could typically be higher for frames with larger content complexity.

Experiments are conducted to explore the relationship among the rate (R), distortion (D), and content complexity (C). In the present example, frames in sequence SlideShow are coded with a constant quantization parameter that equals to 32, and the associated R, D, and C are recorded. FIG. 1 shows the result. As illustrated in FIG. 1, a higher C corresponds to a larger coding distortion and a higher bit consumption when the quantization parameter is fixed. Moreover, the static scenes introduce flatten rate tendency while the abrupt scene change causes rate fluctuation.

In some embodiments, rate (R) and distortion (D) are modelled with respect to content complexity (C) and quantization stepsize (QS) as:

$$R = \alpha \cdot C^\beta \cdot QS^\gamma \tag{3}$$

$$D = \mu \cdot C^\eta \cdot QS^\epsilon \tag{4}$$

where the $\alpha$, $\beta$, $\gamma$, $\mu$, $\eta$, and $\epsilon$ are model parameters.

Figure 2B:
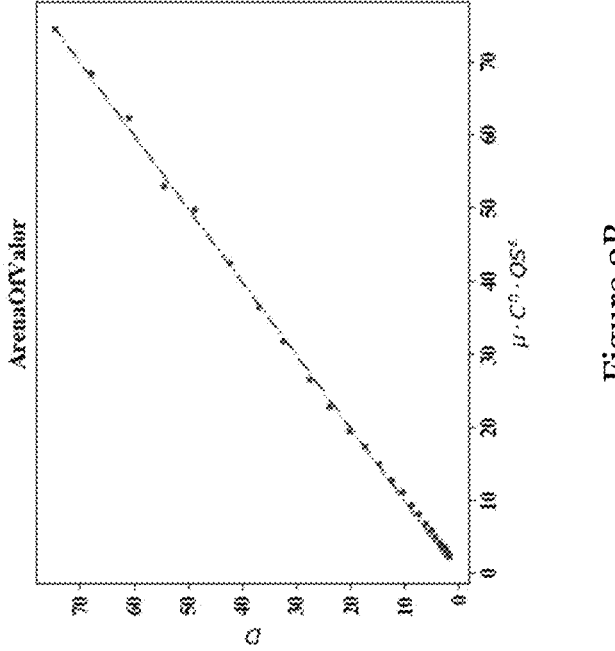
FIG. 2B is a graph showing measured and fitted results of a distortion model (inter frame for video sequence ArenaOfValor) in one embodiment of the invention (the dots represent the obtained coded data and the dashed line represents the fitted model)
Figure 2A:
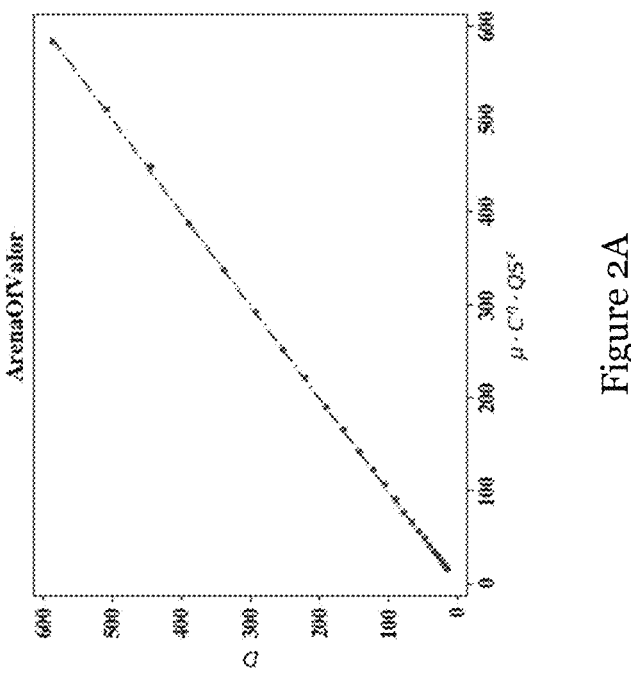
FIG. 2A is a graph showing measured and fitted results of a distortion model (intra frame for video sequence ArenaOfValor) in one embodiment of the invention (the dots represent the obtained coded data and the dashed line represents the fitted model)
Figure 3B:
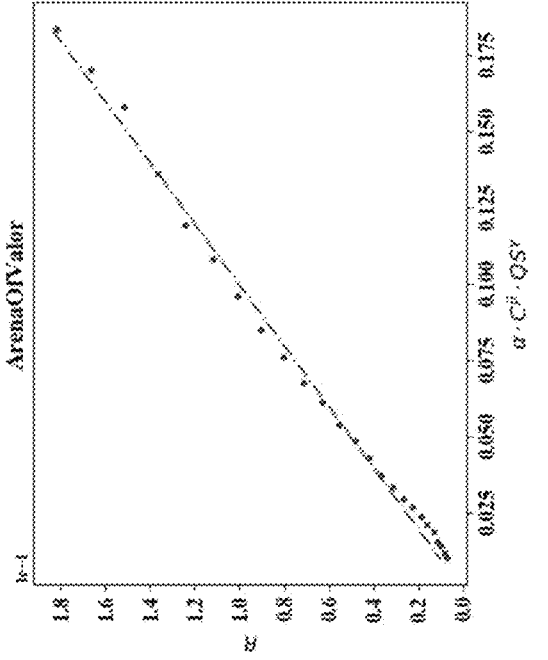
FIG. 3B is a graph showing measured and fitted of a rate model (inter frame for video sequence ArenaOfValor) in one embodiment of the invention (the dots represent the obtained coded data and the dashed line represents the fitted model)
Figure 3A:
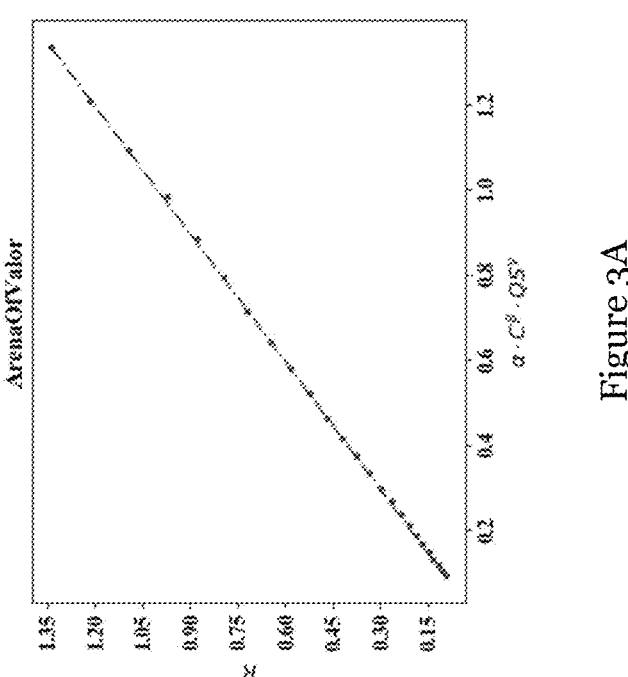
FIG. 3A is a graph showing measured and fitted of a rate model (intra frame for video sequence ArenaOfValor) in one embodiment of the invention (the dots represent the obtained coded data and the dashed line represents the fitted model)

FIGS. 2A and 2B show measured and fitted results of the distortion model (intra frame and inter frame) for video sequence ArenaOfValor whereas FIGS. 3A and 3B show measured and fitted results of the rate model (intra frame and inter frame) for video sequence ArenaOfValor in one example. In FIGS. 2A to 3B, the dots denote the actual coding results (obtained coded data) while the dashed lines denote the fitting results (fitted model). From FIGS. 2A to 3B, it can be observed that the above rate and distortion models embodiments could achieve satisfactory fitting results. To further demonstrate the effectiveness of the models embodiments, the coefficient of determination $R^2$ is determined and summarized in Tables I and II.

TABLE I

| R2 comparison between an existing d-$\lambda$ model and the distortion model in the embodiments | | | | |
|---|---|---|---|---|
| | Intra frame | | Inter frame | |
| | *D-$\lambda$ model | Model Embodiment | *D-$\lambda$ model | Model Embodiment |
| Class B | 0.9939 | 0.9963 | 0.8883 | 0.9950 |
| Class C | 0.9985 | 0.9991 | 0.9731 | 0.9949 |
| Class D | 0.9985 | 0.9993 | 0.9707 | 0.9984 |
| Class E | 0.9976 | 0.9988 | 0.8652 | 0.9945 |
| Screen Content Video | 0.9945 | 0.9963 | 0.9852 | 0.9987 |

*D-$\lambda$ model as disclosed in Li et al., $\lambda$-domain optimal bit allocation algorithm for high efficiency video coding, IEEE Transactions on Circuits and Systems for Video Technology 28 (1) (2016) 130-142.

TABLE II

| R2 comparison between existing rate models and the rate model in the embodiments | | | | | | |
|---|---|---|---|---|---|---|
| | Intra frame | | | Inter frame | | |
| | *R-$\lambda$ model | R-SATD/QS model | Model Embodiment | R-$\lambda$ model | R-SATD/QS model | Model Embodiment |
| Class B | 0.9939 | 0.9404 | 0.9961 | 0.9852 | 0.7828 | 0.9907 |
| Class C | 0.9967 | 0.8046 | 0.9977 | 0.9588 | 0.7361 | 0.9589 |
| Class D | 0.9978 | 0.7971 | 0.9983 | 0.9963 | 0.8336 | 0.9966 |
| Class E | 0.9937 | 0.9498 | 0.9938 | 0.9985 | 0.7353 | 0.9986 |
| Screen Content Video | 0.9963 | 0.8304 | 0.9981 | 0.8889 | 0.6998 | 0.9261 |

R-$\lambda$ model as disclosed in Li et al., $\lambda$ domain rate control algorithm for high efficiency video coding, IEEE transactions on Image Processing 23 (9) (2014) 3841-3854; R-SATD/QS model as disclosed in Ma et al., Rate-distortion analysis for h. 264/AVC video coding and its application to rate control, IEEE transactions on circuits and systems for video technology 15 (12) (2005) 1533-1544.

Both screen content videos and natural scene videos are used in the experiment. The D-$\lambda$ model, the R-$\lambda$ model, and the R-SATD/QS model (from the above-mentioned references) are applied as benchmark for comparison. It should be noted that in the experiment, for the natural scene videos, the screen content coding tools are disabled such that only traditional intra and inter predictions are involved. It can be seen that the models of the embodiment outperform the benchmark models for all of the tested classes, which represents an improvement and advantage on rate and distortion modeling.

To incorporate the models of the embodiment into the bit allocation stage in rate control, the Lagrangian multiplier A is derived from the rate and distortion models of the embodiment such that the optimal bit allocations could be solved via the Lagrange multiplier $\lambda$ during coding. $\lambda$ can be derived from equations (3) and (4), as follows:

$$\lambda = -\frac{\partial D}{\partial R} \tag{5}$$
$$= -\frac{\partial D / \partial QS}{\partial R / \partial QS}$$

-continued $$= -\frac{\partial(\mu \cdot C^{\eta} \cdot QS^{\epsilon})/\partial QS}{\partial(\alpha \cdot C^{\beta} \cdot QS^{\gamma})/\partial QS}$$

$$= x \cdot C^{y} QS^{z}$$

where x, y and z can be calculated as follows:

$$x = -\frac{\mu\epsilon}{\alpha\gamma} \tag{6}$$

$$y = \eta - \beta$$

$$z = \epsilon - \gamma$$

The models in some of these embodiments may provide one or more of the following advantages. First, compared to λ-domain models in Li et al., λ domain rate control algorithm for high efficiency video coding, IEEE transactions on Image Processing 23 (9)(2014) 3841-3854 and Li et. al, λ-domain optimal bit allocation algorithm for high efficiency video coding, IEEE Transactions on Circuits and Systems for Video Technology 28 (1)(2016) 130-142, the models of the embodiment can better represent rate and distortion characteristics for both intra frame and inter frame on different types of video content including natural scene videos and screen content videos. Second, compared with the R-SATD/QS model in Ma et. al., Rate-distortion analysis for h.264/AVC video coding and its application to rate control, IEEE transactions on circuits and systems for video technology 15 (12)(2005) 1533-1544, the models of the embodiment can inherit the content complexity and achieve higher modeling accuracy. The rate and distortion models of the embodiment are content-adaptive, where optimal bit allocation can be attained with the adjustment of the Lagrange multiplier. With the rate control scheme in some embodiments of the invention (described in further detail below), manual design of bit allocation scheme for different types of frames or coding tree units may not be required. Once the pre-encoding analysis is completed, the complexity information of each frame can be understood by the models. Moreover, in the bit allocation stage, the distortion is further equipped with a scaling factor T, as described in further detail below, which represents the temporal importance of the frame or coding tree unit in the group of pictures by considering the inter-frame dependency. A higher scaling factor T indicates a higher similarity with the future frames or coding tree units. Thus, more bits could be allocated to provide better reference quality for future frames or coding tree units, and as a result, the overall coding performance is improved. As such, an analytical solution for effective bit allocation can be developed.

Rate Control Scheme

In the following, a rate control scheme in some embodiments of the invention is presented with the assistance of the coding-tree-unit-based pre-analysis, wherein the rate and distortion models are delicately cooperated. The method in some embodiments of the invention can facilitate accurate bit allocation and quantization parameter determination, which lead to improvement of rate-distortion (RD) performance and bit accuracy.

Figure 4:
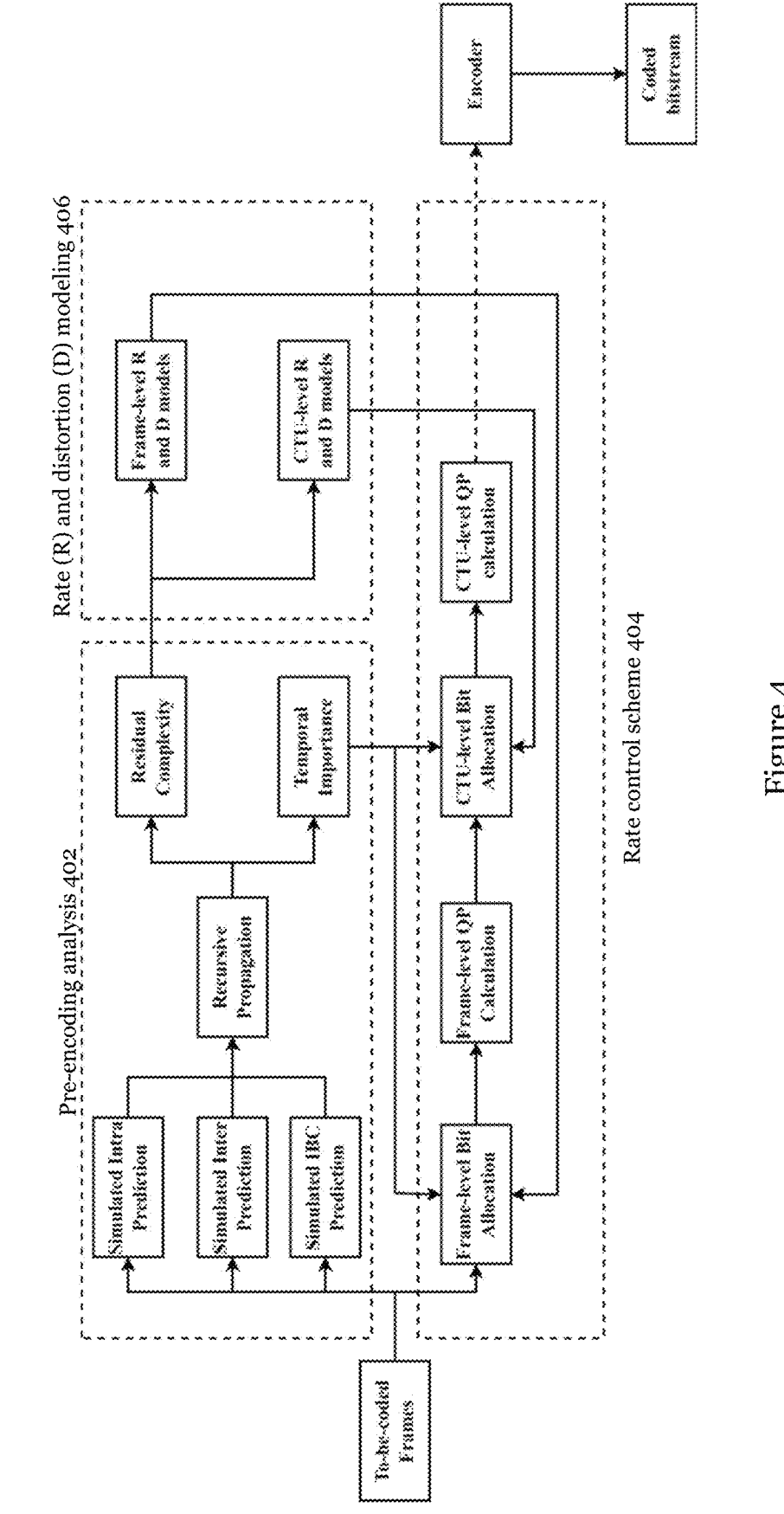
FIG. 4 is a schematic diagram of a method for processing a screen content video in one embodiment of the invention.

FIG. 4 shows a specific implementation of processing of screen content video as mentioned in the beginning of the description. Referring to FIG. 4, the workflow in this example implementation is as follows. First, pre-encoding analysis is conducted before encoding the current group of pictures to extract coding and content characteristics, which are then fed into the rate and distortion models such as the ones in the above embodiments. Then, the pre-encoding analysis results are used for frame-level and coding-tree-unit-level bit allocations. The coding parameters, such as quantization parameter and Lagrangian multiplier λ of each respective frame and/or coding tree unit are calculated according to the allocated bits with the models. Model parameters are then updated after compression of one coding tree unit or frame is accomplished.

Pre-Encoding Analysis 402 with Coding Tree Unit

In this example, the pre-encoding analysis is conducted before encoding the current group of pictures to extract or determine content characteristics. In particular, with the pre-analysis, the complexity (C) and temporal importance (T) are obtained for rational bit allocation. In this example, the pre-encoding analysis method is based on the coding tree unit scheme. Specifically, the complexity is measured with Hadamard-transformed residual after simplified predictions while the temporal importance is calculated with the recursive propagation process. Compared with a traditional coding tree unit, the method of some embodiments of the invention adopt similar complexity analyzing strategy for inter prediction and intra prediction. Since the intra block copy prediction plays a dominant role in screen content coding, in some embodiments, a series of modifications are applied for coding-tree-unit-based pre-encoding analysis to enhance content adaptation. More specifically, in addition to inter and intra predictions, intra block copy (IBC) is specifically considered in the pre-encoding analysis stage. A simulated intra block copy prediction is conducted for each coding unit to measure the residual complexity. Motion estimation is carried out to search the reference block within the allowed reference region in the current frame. After obtaining the reference block, the intra block copy prediction is conducted, and the prediction error is transformed with Hadamard transformation. As such, the complexity of coding units sharing similar content characteristics with spatial neighboring blocks can be effectively captured.

Subsequently, recursive propagation is improved with the consideration of the complexity according to the simulated intra block copy prediction and coding-unit-level dependency. The principle of recursive propagation is to quantitatively measure the distortion caused by reference with the inter prediction or intra block copy prediction, by means of propagating a fraction of coding distortion back to the reference. Intuitively, the frequently-referenced frames or coding units should receive preferential treatment during bit allocation, with more bits allocated to them. In contrast, less-frequently referenced frames or coding units has less impact on the to-be-coded coding units, such that they can be allocated with fewer bits.

Regarding the recursive propagation process, the frame-level quality dependency information is defined, e.g. based on Li et al., λ-domain optimal bit allocation algorithm for high efficiency video coding, IEEE Transactions on Circuits and Systems for Video Technology 28 (1)(2016) 130-142 and He et al., Adaptive quantization parameter selection for h.265/HEVC by employing inter-frame dependency, IEEE Transactions on Circuits and Systems for Video Technology 28 (12)(2017) 3424-3436, as $$\frac{\partial D_j}{\partial D_i} = \delta_{j,i} \tag{7}$$

where frame j is the to-be-coded frame and frame i is the reference frame; $D_i$ and $D_j$ are the distortion of frame i and j, respectively. The principle behind equation (7) is that the distortion of the to-be-coded frame is linearly related to the distortion of reference frame. $\delta_{j,i}$ is the propagation factor indicating the proportion of distortion caused by inter-frame reference. The distortion terms in equation (7) are measured in MSE.

In this example, during the propagation process, equation (7) is further applied to the coding unit level, $$\frac{\partial D_{j,n}}{\partial D_{i,m}} = \delta_{j,n,i,m} \tag{8}$$

where the $D_{j,n}$ is the distortion of the n-th coding unit in frame j, $D_{i,m}$ is the distortion of the m-th coding unit in frame i, which is the reference block of coding unit n. It should be noted that quality dependency relationships may exist within one frame when taking the intra block copy prediction into consideration (i=j).

As such, the accumulated temporal importance of one specific coding unit within one group of pictures can be derived as:

$$\tau_{i,m} = \frac{\partial D}{\partial D_{i,m}} \tag{9}$$

$$= \frac{\partial \left( \sum_{j=i+1}^{N_{GOP}} \Sigma_p D_{j,p} + \sum_{p=m}^{N_{cu}} D_{i,p} \right)}{\partial D_{i,m}}$$

$$= 1 + \frac{\Sigma_{(k,l)\in s(i,m)} \partial D_{k,l}}{\partial D_{i,m}}$$

$$= 1 + \omega_{i,m}$$

where $\tau_{i,m}$ is the temporal importance of the m-th coding unit in frame I; D is the total distortion of the group of pictures; $N_{GOP}$ is the number of frames in current group of pictures; $N_{cu}$ is the number of coding units in each frame; s(i, m) is the set of all coding units in current group of pictures that directly or indirectly utilize the m-th coding unit in frame i as reference; $\omega_{i,m}$ is the factor that reflects the influence of $D_{i,m}$ on the distortion of future coding units.

Furthermore, in this example, when developing equation (9) into a recursive formula, $\omega_{i,m}$ is simplified by classifying coding units in s(i, m) into two categories. The first category involves coding units that directly employ the m-th coding unit in frame i as reference. In the second category, the references of the coding units refer to the m-th coding unit in frame i. As such, coding units in s(i,m) can be organized according to their reference chain. By incorporating equation (8) into equation (9), $\omega_{i,m}$ can be developed as $$\omega_{i,m} = \sum_{(k,l)\in s'(i,m)} \left( \frac{\partial D_{k,l}}{\partial D_{i,m}} + \Sigma_{(k',l')\in s(k,l)} \frac{\partial D_{k',l'}}{\partial D_{i,m}} \right) \tag{10}$$

$$= \sum_{(k,l)\in s'(i,m)} \left( \frac{\partial D_{k,l}}{\partial D_{i,m}} + \Sigma_{(k',l')\in s(k,l)} \frac{\partial D_{k',l'}}{\partial D_{k,l}} \cdot \frac{\partial D_{k,l}}{\partial D_{i,m}} \right)$$

$$= \sum_{(k,l)\in s'(i,m)} \left( \delta_{k,l,i,m} + \delta_{k,l,i,m} \Sigma_{(k',l')\in s(k,l)} \frac{\partial D_{k',l'}}{\partial D_{k,l}} \right)$$

$$= \sum_{(k,l)\in s'(i,m)} \left( \delta_{k,l,i,m} \cdot \left( 1 + \Sigma_{(k',l')\in s(k,l)} \frac{\partial D_{k',l'}}{\partial D_{k,l}} \right) \right)$$

$$= \Sigma_{(k,l)\in s'(i,m)} (\delta_{k,l,i,m} \cdot \tau_{k,l})$$

where s'(i,m) is the set of coding units which directly refers to m-th coding unit in frame i. $D_{k',l'}$ is the distortion of the l'-th coding unit located in frame k', which is in the reference chain of l-th coding unit in frame k.

By incorporating equation (10) into equation (9), the recursive relationship of the coding-unit-level temporal importance could be obtained as:

$$\tau_{i,m} = 1 + \sum_{(k,l)\in s'(i,m)} (\delta_{k,l,i,m} \cdot \tau_{k,l}) \tag{11}$$

In this example, during the implementation, $\tau_{k,l}$ is initialized to 1. Coding units in the to-be-coded group of pictures are visited in the reverse coding order to recursively propagate the temporal importance to the possible references. As such, $\tau_{i,m}$ for each coding unit can be obtained.

The coding-unit-level dependency information $\delta_{k,l,i,m}$ is defined in the same way as in, e.g., Garrett-Glaser, *A novel macroblock-tree algorithm for high-performance optimization of dependent video coding in h.264/AVC, Tech. Rep.* (2009) and Liu et al., *Optimize x265 rate control: An exploration of lookahead in frame bit allocation and slice type decision, IEEE Transactions on Image Processing* 28 (5)(2018) 2558-2573, as:

$$\delta_{k,l,i,m} = 1 - \frac{C_{k,l,i,m}}{C_{intra,k,l}} \tag{12}$$

where $C_{intra,k,l}$ is the intra complexity of l-th coding unit in frame k; $C_{k,l,i,m}$ is the complexity of the l-th coding unit when predicted with m-th coding unit, which is given by $$C_{k,l,i,m} = \begin{cases} \min(C_{ibc,l,m}, C_{intra,k,l}), \text{ if } k = i \\ \min(C_{inter,l,m}, C_{intra,k,l}), \text{ otherwise} \end{cases} \tag{13}$$

to where $C_{i,b,c,l,m}$ is the complexity of l-th coding unit after intra block copy prediction referring to m-th coding unit in the same frame; $C_{inter,i,m}$ is the inter complexity of l-th coding unit referring to m-th coding unit in frame i.

In this example, if the $C_{intra,k,i}$ is the lowest, intra mode is more prone to be selected. In this case, the coding distortion is independent of temporal reference such that $\delta_{k,l,i,m}$ is set to zero. Otherwise, the distortion of coding unit 1 is related to the inter reference or intra block copy reference, depending on which could provide the coding unit 1 with more accurate prediction. Consequently the chain of reference relationship is achieved, which enables the distortion propagated from the current analysing coding unit to the reference.

As such, the temporal importance of each coding tree unit is calculated as the averaged temporal importance of coding units within the coding tree unit, $$T_{i,M} = \frac{\Sigma_{p\in M} \tau_{i,p}}{N_M} \tag{14}$$

where $T_{i,M}$ is the temporal importance of M-th coding tree unit in frame I; p is the coding unit index locating in the M-th coding tree unit; $N_M$ is the number of coding units in coding tree unit M.

And the temporal importance of the i-th frame $T_i$ is the average temporal importance of all coding units within the frame:

$$T_i = \frac{\sum_p \tau_{i,p}}{N_{cu}} \qquad (15)$$

Rate Control Scheme 404

In this embodiment, rate control is achieved or performed with the assistance of the pre-encoding analyzed temporal importance and content complexity. Specifically, the group of pictures level bit allocation is first conducted according to the pre-encoding analyzed results. Frame-level and coding-tree-unit-level bit allocations are subsequently achieved with the Lagrange multiplier. Quantization parameter and $\lambda$ for each frame and coding tree unit are correspondingly calculated from target bits and models. Model parameters are updated when the encoding of each frame or coding tree unit is accomplished.

In some embodiments the scheme basically involves group of pictures level bit allocation, frame-level bit allocation, coding-tree-unit-level bit allocation, and model update.

Group of pictures Level Bit Allocation: In this example, in group of pictures level bit allocation, the allocated bits are influenced by the base target bits, which is related to the average bits per frame and the number of frames in the group of pictures, and the accumulated bits difference between historical consumed bits and target bits. This ensures that the output bitrate could satisfy the target bitrate. The group of pictures level target bits can be calculated as follows $$R_{GOP} = \frac{\bar{R} \cdot (N_{GOP} + SW) - R_\Delta}{N_{GOP} + SW} \cdot N_{GOP} \qquad (16)$$

where $N_{GOP}$ is the frame numbers in the to-be-coded group of pictures; $R_\Delta$ is the accumulated bits difference between coded bits and target bits; SW is the sliding window size to smooth the $R_\Delta$; $\bar{R}$ is the average bits per frame computed as:

$$\bar{R} = br/fr \qquad (17)$$

where br and fr indicate the target bitrate and the given frame rate.

Frame-level Bit Allocation: Regarding the frame-level bit allocation, in this example, the optimal number of target bits for each frame is represented as a function of group of pictures level $\lambda$, and the group of pictures level $\lambda$ is solved through a numerical method. More specifically, the bit allocation aims to minimize the distortion measured in MSE under the constraint of the group of pictures level bit budget as follows $$\min \sum_i D_i \ \text{s.t.} \ \sum_i R_i \le R_{GOP} \qquad (18)$$

where i is the frame index in the to-be-coded group of pictures. By using the Lagrange multiplier, the above constrained optimizing problem can be converted into unconstrained optimizing problem as $$\min\{J\} = \sum_i D_i + \lambda\left(\sum_i R_i - R_{GOP}\right) \qquad (19)$$

It should be noted that in conventional method, the distortion ($D_i$) of frame i is equally added into the cost function, which may not be optimal as inter-frame dependency is ignored. Intuitively, as the similarity between two frames increases, the distortion of reference frame will inevitably influence the coding quality of the current frame. As such, the temporal importance calculated in equation (15) are used in equation (19) as:

$$\min\{J\} = \sum_i T_i D_i + \lambda\left(\sum_i R_i - R_{GOP}\right) \qquad (20)$$

The optimal bit allocation for the i-th frame is achieved when the derivative of J with regard to $R_i$ equals to 0:

$$\frac{\partial J}{\partial R_i} = T_i \frac{\partial D_i}{\partial R_i} + \lambda = 0. \qquad (21)$$

As such, the relationship between frame-level $\lambda_i$ and group of pictures level $\lambda$ can be calculated as $$\lambda_i = -\frac{\partial D_i}{\partial R_i} = \frac{\lambda}{T_i} \qquad (22)$$

By substituting equation (5) into equation (22), the relationship between QS of frame i and group of pictures level $\lambda$ can be derived as:

$$QS_i = \left(\frac{\lambda}{T_i \cdot x_i \cdot C_i^{y_i}}\right)^{1/z_i} \qquad (23)$$

where $C_i$ is the frame complexity obtained from pre-analysis. As such, given $\lambda$, the corresponding $QS_i$ can be determined.

By incorporating equation (23) into equation (3), the target bits for the i-th frame are determined as follows:

$$R_i = \alpha_i \cdot C_i^{\beta_i - y_i \cdot \gamma_i / z_i} \cdot \left(\frac{\lambda}{T_i \cdot x_i}\right)^{\gamma_i / z_i}. \qquad (24)$$

The frame-level bit allocation can be realized by regarding the target bits of each frame as a function of $\lambda$ and using bi-section method disclosed in Li et al., $\lambda$-*domain optimal bit allocation algorithm for high efficiency video coding*, *IEEE Transactions on Circuits and Systems for Video Technology* 28 (1)(2016) 130-142 to numerically solve the group of pictures level $\lambda$ with group of pictures bit budget $R_{GOP}$.

As the group of pictures level 2 is solved with bit budget and models, the target bits and $\lambda_i$ for each frame can be computed from equation (24). Meanwhile, the $\lambda_i$ can be computed with group of pictures level $\lambda$ with equation (22). The quantization parameter for the i-th frame can be obtained from QS, as:

$$QP = p_2 \log_2(QS) + p_1 \qquad (25)$$

where $p_1$ and $p_2$ are model parameters. QS of frame i is obtained from equation (23) with group of pictures level $\lambda$.

Coding-Tree-Unit-Level Bit Allocation: Analogous to the frame-level bit allocation, the coding-tree-unit-level target bits and coding parameters can be solved with rate-distortion optimization and the models of some embodiments. Similar to equation (20), the optimization problem in this example can be described as:

$$\min\{J_i\} = \sum_M T_{i,M} D_{i,M} + \lambda_i' \left( \sum_M R_{i,M} - R_i \right) \tag{26}$$

where $T_{i,M}$ is the weight of M-th coding tree unit in frame i; $R_i$ is the target bits of the i-th frame obtained from frame-level bit allocation; $\lambda_i'$ is the Lagrange parameter governing the trade-off between rate and distortion for current frame. It should be noted that in some embodiments $\lambda_i'$ may not equal to $\lambda_i$ in equation (22) as the RD characteristics of coding tree units are not identical.

Analogous to equation (22), the relationship between $\lambda_{i,M}$, which is the $\lambda$ of M-th coding tree unit in frame i, and $\lambda_i'$, can be calculated by setting the derivative of $J_i$ with regard to $R_{i,M}$ to zero:

$$\lambda_{i,M} = -\frac{\partial D_{i,M}}{\partial R_{i,M}} = \frac{\lambda_i'}{T_{i,M}} \tag{27}$$

Thus, the QS of Each Coding Tree Unit is Derived Similar to Equation (23) as $$QS_{i,M} = \left( \frac{\lambda_i'}{T_{i,M} \cdot x_{i,M} \cdot C_{i,M}^{y_{i,M}}} \right)^{1/z_{i,M}} . \tag{28}$$

The target bits $R_{i,M}$ can be represented as a function of $\lambda_i'$ with equation (28) and coding-tree-unit-level rate model in equation (3), as:

$$R_{i,M} = \alpha_{i,M} \cdot C_{i,M}^{\beta_{i,M} - y_{i,M} \cdot \gamma_{i,M}/z_{i,M}} \cdot \left( \frac{\lambda_i'}{T_{i,M} \cdot x_{i,M}} \right)^{\gamma_{i,M}/z_{i,M}} . \tag{29}$$

As a result, $\lambda_i'$ can be approximated with equation (29) and the frame-level target bits $R_i$ using the bi-section method. As such, for each coding tree unit, $R_{i,M}$, $\lambda_{i,M}$ and $QS_{i,M}$ can be solved from equations (29), (27), and (28) with $\lambda_i'$, respectively. The quantization parameter for each coding tree unit is obtained by incorporating $QS_{i,M}$ into quantization parameter-QS relationship in equation (25).

Model Update: In this example, after the encoding of each coding tree unit or frame is finished, the rate and distortion models in equations (3) and (4) are updated to adapt new content. In addition, the associated $\lambda$ in equation (5) should be recalculated with regard to updated model parameters. In particular, to update model parameters in equation (3), adaptive Least Mean Square method as disclosed in Widrow et al., *Adaptive switching circuits, Tech. rep., Stanford Univ Ca Stanford Electronics Labs* (1960) can be used to minimize the difference between target bits $R_{tar}$ and actual coding bits $R_{real}$ in logarithm domain as:

$$e = (\ln R_{tar} - \ln R_{real})^2 \tag{30}$$

where $\ln R_{tar}$ is computed from equation (3) as $$\ln R_{tar} = \ln \alpha + \beta \cdot \ln C + \gamma \cdot \ln QS \tag{31}$$

To update a after encoding one frame or coding tree unit, the derivative of e with regard to $\alpha$ is computed as $$\frac{\partial e}{\partial \alpha} = \frac{\partial e}{\partial \ln R_{tar}} \cdot \frac{\partial \ln R_{tar}}{\partial \ln \alpha} \cdot \frac{\partial \ln \alpha}{\partial \alpha} = 2(\ln R_{tar} - \ln R_{real})/\alpha \tag{32}$$

As such, parameter $\alpha$ can be updated as follows $$\alpha_{new} = \alpha_{old} - 2\Delta(\ln R_{tar} - \ln R_{real})/\alpha_{old} \tag{33}$$

where $\Delta$ is the update stepsize and set to 0.05; $R_{tar}$ is the target bits and $R_{real}$ the actual coding bits.

Analogously, the updating scheme for the remaining parameters in equation (3) and parameters in equation (4) can be derived as follows:

$$\beta_{new} = \beta_{old} - 2\Delta \cdot (\ln R_{tar} - \ln R_{real}) \cdot \ln C \tag{34}$$

$$\gamma_{new} = \gamma_{old} - 2\Delta \cdot (\ln R_{tar} - \ln R_{real}) \cdot \ln QS$$

$$\mu_{new} = \mu_{old} - 2\Delta \cdot (\ln D_{tar} - \ln D_{real})/\mu_{old}$$

$$\eta_{new} = \eta_{old} - 2\Delta \cdot (\ln D_{tar} - \ln D_{real}) \cdot \ln C$$

$$\epsilon_{new} = \epsilon_{old} - 2\Delta \cdot (\ln D_{tar} - \ln D_{real}) \cdot \ln QS$$

where $\Delta$ is the update stepsize and set to 0.05; $R_{tar}$ is the target bits and $R_{real}$ the actual coding bits; $D_{tar}$ is the predicted distortion calculated from distortion model of equation (4) with the pre-encoding analyzed complexity and encoding QS. $D_{real}$ is the distortion obtained after the encoding is accomplished.

EXPERIMENTAL RESULTS

Experiments are conducted to verify the performance or effectiveness of the above embodiments of the invention. In the following, the experiment setup is first introduced. Then the bitrate variation regarding the difference between output bitrate and target bitrate is evaluated. The rate-distortion (RD) performance and quality fluctuation of the method of the above embodiments are compared with those of some existing methods, and computational complexity analysis is conducted.

To evaluate the effectiveness of the method of the above embodiments of the invention, the rate control scheme in the above embodiments is implemented to the VTM-9.0 as disclosed in Chen et al., *Algorithm description for Versatile Video Coding and Test Model 9 (VTM 9), Joint Video Experts Team (JVET), doc. JVET-R2002 (2020).* Screen content sequences are involved in the experiment. The numbers of target bits for each sequence are obtained by encoding the sequence with quantization parameter 22, 27, 32, 37, following the SCC test conditions as disclosed in Bossen et al., *JVET common test conditions and software reference configurations for SDR video, Joint Video Experts Team (JVET), doc. JVET-N1010 (2019).* The default coding-tree-unit-level hierarchical R-$\lambda$ rate control in VTM-9.0 is employed as the anchor. All experiments are carried out on a CPU cluster with 96 Intel® Xeon® CPU E7-8860 v3 @ 2.20 GHz cores and 128 GB memory.

To evaluate the performance of the method of the above embodiments of the invention, the method in Wang et al., *A frame level rate control algorithm for screen content coding*, 2018 *IEEE International Symposium on Circuits and Systems* (*ISCAS*), *IEEE*, 2018, pp. 1-4 and in the method in Yang et al., *A content-based rate control algorithm for screen content video coding*, *Journal of Visual Communication and Image Representation* 60 (2019) 328-338 are used for comparison. The method in the above embodiments of the invention is denoted as "Proposed-TI+IBC+M". In addition, "Proposed-TI" and "Proposed-TI+M" are also applied for comparison, in which "Proposed-TI" represents the default λ domain model refined with pre-encoding analyzed temporal importance above in the above embodiments of the invention while "Proposed-TI+M" denotes the rate and distortion models above in the above embodiments of the invention with pre-encoding analyzed temporal importance. The overall method "Proposed-TI+IBC+M" employs the rate and distortion models above in the above embodiments of the invention, with pre-encoding analyzed temporal importance and intra block copy simulation in pre-encoding analysis involved.

For bitrate error evaluation, as rate control aims to produce bitstream with the output bitrate approximated to a given target bitrate, the difference between the output bitrate and the target bitrate is an important evaluation criteria of rate control algorithms. In this example, the bitrate error (BRE) is calculated as follows:

$$BRE = \frac{R_{output} - R_{target}}{R_{target}} \times 100\% \quad (35)$$

where $R_{output}$ is the output bitrate after coding the sequence and $R_{target}$ is the target bitrate assigned to the sequence. The results are shown in Table III.

TABLE III

Comparison of bitrate error (%)

| Video Sequence | Anchor | Proposed-TI + M | Proposed-TI + IBC + M |
|---|---|---|---|
| ArenaOfValor | 0.24 | 0.24 | 0.24 |
| ChineseDocumentEditing | 3.88 | 5.64 | 4.13 |
| scconsole | 0.48 | 0.48 | 0.48 |
| scdesktop | 0.47 | 0.35 | 0.37 |
| scflyingGraphics | 0.09 | 0.09 | 0.09 |
| BasketballDrillText | 0.29 | 0.29 | 0.29 |

TABLE III-continued

Comparison of bitrate error (%)

| Video Sequence | Anchor | Proposed-TI + M | Proposed-TI + IBC + M |
|---|---|---|---|
| SlideEditing | 5.64 | 1.92 | 2.82 |
| SlideShow | 13.21 | 0.78 | 0.92 |
| Average | 3.04 | 1.22 | 1.17 |

From the above, it can be seen that the method in the above embodiments of the invention could effectively reduce the bitrate error. In particular, the BRE of the default λ-domain rate control is 3.04% whereas the BRE of the method in the above embodiments of the invention is 1.22% without intra block copy simulation and 1.17% with intra block copy simulation. Specifically, for the video sequence SlideShow, the BRE is significantly decreased with the method in the above embodiments of the invention, where the associated BRE is only 0.78%. As such, when compared with the default scheme, the method in the above embodiments of the invention improves bitrate control.

For rate-distortion (RD) performance comparisons, the RD performance is measured by the Bjontegaard delta bit-rate (BDBR), as disclosed in *G. Bjontegaard, Calculation of average PSNR differences between RD-curves, ITU-T VCEG Meeting, Austin, Texas, USA, Tech. Rep, doe. VCEG-M33* (2001). A negative BDBR indicates an RD performance improvement. Analogously, the default coding-tree-unit-level hierarchical λ-domain rate control in VTM-9.0 is regarded as the anchor (reference) for evaluation. The RD performance is shown in Table IV.

TABLE IV

Comparison of the BDBR (%) in terms of PSNR

| Video Sequence | Wang et al. | Yang et al. | Proposed-TI | Proposed-TI + M | Proposed-TI + IBC + M |
|---|---|---|---|---|---|
| ArenaOfValor | −1.82 | −2.10 | −2.56 | −2.85 | −3.11 |
| ChineseDocumentEditing | −1.77 | −1.37 | −1.82 | −2.19 | −4.42 |
| scconsole | −0.88 | −1.02 | −0.95 | −1.06 | −1.38 |
| scdesktop | −3.81 | −4.74 | −5.80 | −6.35 | −6.99 |
| scflyingGraphics | −0.25 | −0.71 | −0.16 | −0.39 | −0.48 |
| BasketballDrillText | 1.57 | 0.55 | −2.20 | −2.36 | −2.41 |
| SlideEditing | −0.49 | −0.31 | −0.12 | −0.23 | −0.33 |
| SlideShow | −6.75 | −8.13 | −9.06 | −10.70 | −12.64 |
| Average | −1.78 | −2.23 | −2.83 | −3.27 | −3.97 |

It can be seen that the method of the above embodiments of the invention achieves 3.97% Bjontegaard delta bit-rate savings on average. The BDBR results for the method in Wang et al. and the method in Yang et al. as mentioned above are involved for comparison. The BDBR gains of the method in Wang et al. and the method in Yang et al. are, on average, 1.78% and 2.23% respectively. However, the method in Wang et al. has a 1.57% performance loss on the sequence BasketballDrillText. The performance degradation can also be observed for the method in Yang et al., with 0.55% BD-Rate loss on sequence BasketballDrillText. This might be due to the fact that this sequence contains natural scene content more than screen content, which leads to less effective rate control. Moreover, temporal information, especially in terms of the inter-frame correlation among multiple frames, is neglected in the method in Wang et al. and the method in Yang et al, which results in bit allocation inferior to the anchor rate control. The method of the above embodiments of the invention is relatively robust with respect to content and dynamic motions, and can achieve 2.41% BDBR gains on sequence BasketballDrillText when compared with the anchor.

Figure 5C:
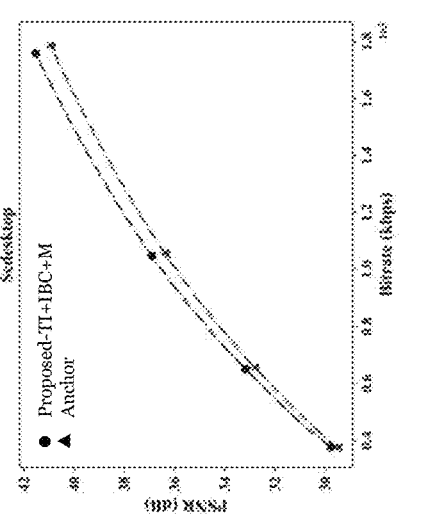
FIG. 5C is a graph showing rate-distortion (RD) performance (PSNR in dB vs bitrate in kbps) of the method of one embodiment of the invention ("proposed") and a reference method ("anchor") in the processing of video sequence sc desktop.
Figure 5B:
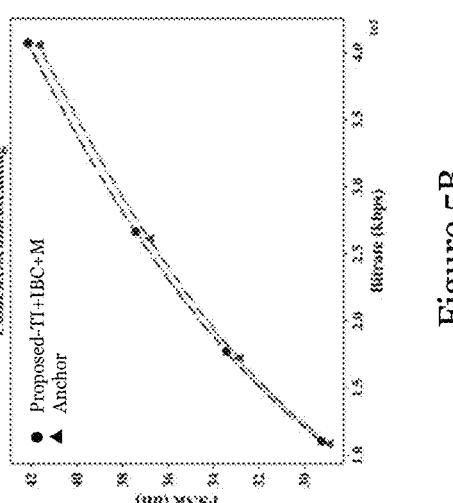
FIG. 5B is a graph showing rate-distortion (RD) performance (PSNR in dB vs bitrate in kbps) of the method of one embodiment of the invention ("proposed") and a reference method ("anchor") in the processing of video sequence ChineseDocumentEditing.
Figure 5A:
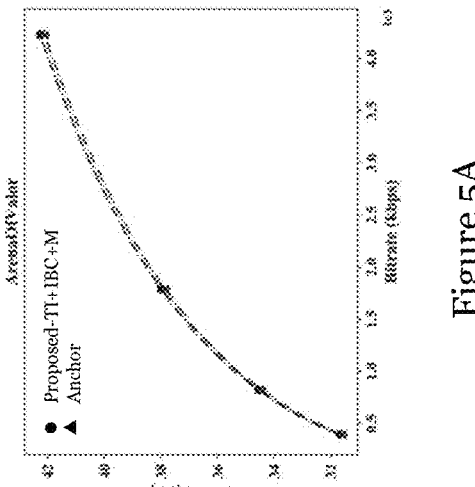
FIG. 5A is a graph showing rate-distortion (RD) performance (PSNR in dB vs bitrate in kbps) of the method of one embodiment of the invention ("proposed") and a reference method ("anchor") in the processing of video sequence ArenaOfValor.

FIGS. 5A to 5C further show the rate-distortion (RD) performance of the method of the embodiment of the invention ("Proposed-TI+IBC+M") and the abovementioned reference method ("anchor") in the processing of video sequence ArenaOfValor, ChineseDocumentEditing, and sc desktop respectively.

To demonstrate the effectiveness of the method of the above embodiments of the invention ("Proposed-TI+IBC+M"), the "Proposed-TI" and "Proposed-TI+M" as mentioned above are involved for comparison. When the pre-encoding analysis is incorporated, scene changes could be detected and reflected in the temporal importance, resulting in more reasonable bit allocation. As such, the "Proposed-TI" brings 2.83% BDBR savings on average. The models of the above embodiments of the invention could further enhance the rate control performance, where on average 3.27% BDBR savings are achieved on "Proposed-TI+M". When taking the screen content coding technique intra block copy coding into account, the rate control performance could be significantly improved, where 12.64% BDBR gains are achieved on sequence SlideShow.

In terms of quality fluctuation comparisons, quality fluctuation typically influences the perceptual quality of reconstructed videos. Less fluctuation could provide the subjects with a smoother visual experience. In this example, to evaluate the quality fluctuation, the variance of PSNR among all frames within one video is calculated as follows:

$$\text{var} = \frac{\sum_i^N (Q_i - Q_{avg})^2}{N} \quad (36)$$

where $Q_i$ is the quality measured in PSNR of the i-th frame; $Q_{avg}$ is the average PSNR of all frames in the sequence; N is the number of frames in the sequence. The results are listed in Table V.

TABLE V

| Comparison on the variance of PSNR | | |
|---|---|---|
| Video Sequence | Anchor | Proposed-TI + IBC + M |
| ArenaOfValor | 1.52 | 2.28 |
| ChineseDocumentEditing | 17.11 | 10.37 |
| scconsole | 3.98 | 5.77 |
| scdesktop | 11.42 | 13.51 |
| scflyingGraphics | 3.13 | 4.10 |
| BasketballDrillText | 0.85 | 1.18 |
| SlideEditing | 25.79 | 24.91 |
| SlideShow | 72.00 | 65.89 |
| Average | 16.97 | 16.00 |

It should be noted that for each sequence, there are four PSNR values each corresponding to a respective encoding bitrate. For simplicity, here, the average of the four variances is calculated to represent the overall quality smoothness. On average, the quality fluctuation is reduced by 0.97 with the method of the above embodiments of the invention when compared to the anchor. This demonstrates that the method of the above embodiments of the invention could achieve less quality fluctuation. Compared to the anchor, for sequences with larger quality fluctuation, such as sequence SlideShow, the variance of PSNR is significantly reduced while for sequences with lower quality fluctuation, such as sequence BasketballDrillText, the variance of PSNR is slightly increased. This might be because in the method of the above embodiments of the invention, the frame content could be accurately analyzed based on the residual complexity and temporal importance, which are further used to guide bit allocation. Lower quality fluctuation indicates that the content and motion variation are small such that the default rate control scheme can assign reasonable bits to each frame. For sequences with larger quality fluctuation, scene change or large motion will be more frequently observed such that the default bit allocation scheme may fail to assign proper bits for each frame. In the method of the above embodiments of the invention, by analyzing the residual and temporal relationship, bits can be more reasonably allocated to sequences with scene change and large motion to compensate for the new information among frames. Moreover, frames in lower temporal layers receive more attention with the method of the above embodiments of the invention, which provides better reference quality for future frames.

Figures 6A, 6B:
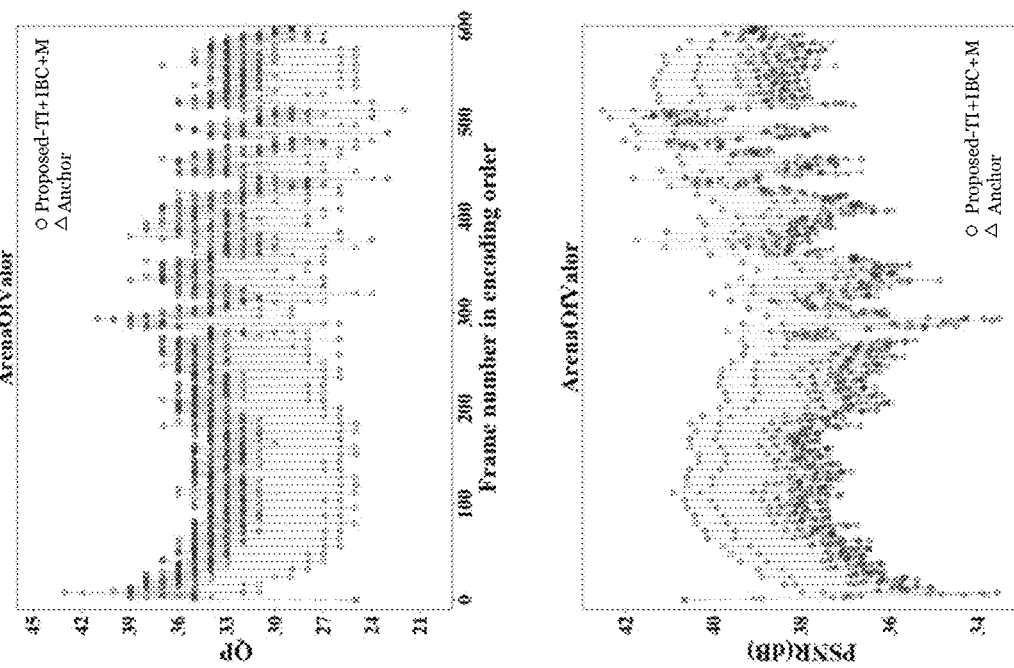
FIG. 6A is a graph showing the quantization parameter (QP) values of each frame in the encoding order using the method of one embodiment of the invention ("proposed") and a reference method ("anchor") in the processing of video sequence ArenaOfValor.
FIG. 6B is a graph showing the PSNR values of each frame in the encoding order using the method of one embodiment of the invention ("proposed") and a reference method ("anchor") in the processing of video sequence ArenaOfValor.
Figures 7A, 7B:
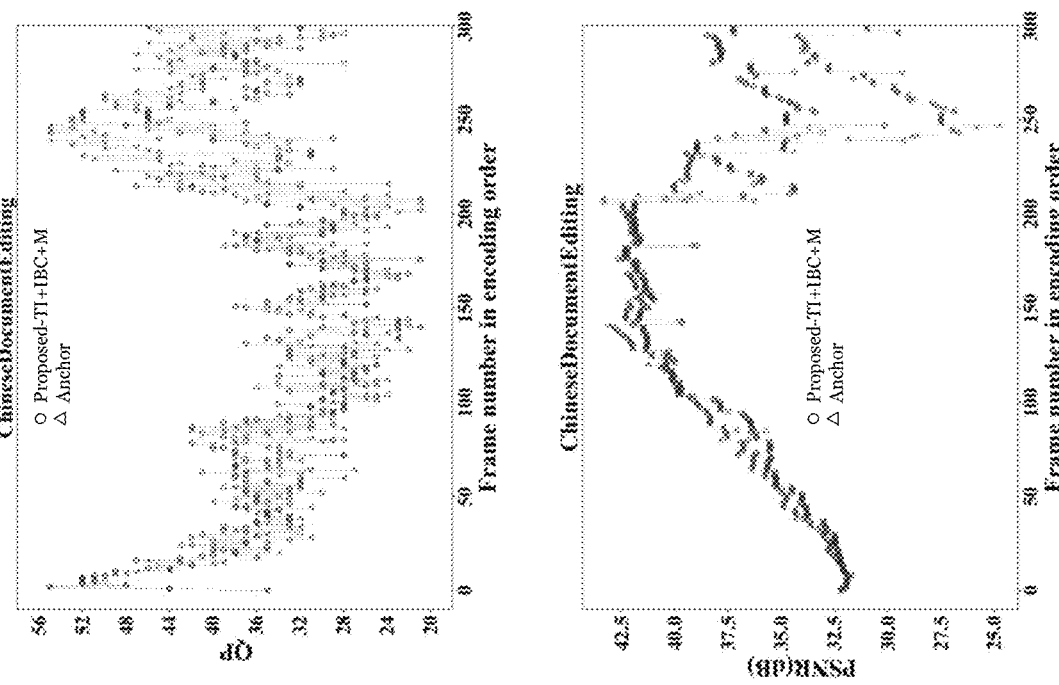
FIG. 7A is a graph showing the quantization parameter (QP) values of each frame in the encoding order using the method of one embodiment of the invention ("proposed") and a reference method ("anchor") in the processing of video sequence ChineseDocumentEditing.
FIG. 7B is a graph showing the PSNR values of each frame in the encoding order using the method of one embodiment of the invention ("proposed") and a reference method ("anchor") in the processing of video sequence ChineseDocumentEditing.

FIGS. 6A to 7B illustrate the quality fluctuation comparison, wherein FIGS. 6A and 7A illustrate the quantization parameter values of each frame in the encoding order and FIGS. 6B and 7B are the PSNR values of each frame in the encoding order. Specifically, FIGS. 6A and 6B show the quantization parameter (QP) values and the PSNR values of each frame in the encoding order using the method of one embodiment of the invention ("Proposed-TI+IBC+M") and a reference method ("anchor") in the processing of video sequence ArenaOfValor. FIGS. 7A and 7B show the quantization parameter (QP) values and the PSNR values of each frame in the encoding order using the method of one embodiment of the invention ("Proposed-TI+IBC+M") and a reference method ("anchor") in the processing of video sequence ChineseDocumentEditing.

Referring to FIGS. 6A and 6B, for the sequence ArenaOfValor, the quantization parameter values of the method of the above embodiments of the invention for low level frames are smaller than that of the anchor, which indicates that the low level frames have more influence on the high level frames. By enhancing the quality of low level frames, the RD performance of the whole sequence could be improved. Referring to FIGS. 7A and 7B, for the sequence ChineseDocumentEditing, large motion and content variation could be detected, especially in the last 100 frames, resulting in high PSNR fluctuation when employing the anchor rate control scheme. With the method of the above embodiments of the invention, the variation is detected, and smoother quantization parameters are adopted to encode each frame. Thus, the overall variance of PSNR is reduced and bitrate saving is achieved.

The encoding complexity of the method of the above embodiments of the invention is evaluated. Theoretically, in the method of the above embodiments of the invention, the additional time consumption mainly originates from the pre-encoding analysis process. In particular, simplified predictions and transformation are carried out for each individual fixed-size coding unit. The encoding complexity increase of each sequence is computed as $$\Delta T = \frac{T_{proposed} - T_{anchor}}{T_{proposed}} \times 100\% \quad (37)$$

where $T_{proposed}$ and $T_{anchor}$ represent the coding time of the method of the above embodiments of the invention ("Proposed-TI+IBC+M") and the anchor encoder, respectively. The encoding time increases are summarized in Table VI.

TABLE VI

| Comparisons of the computational complexity | |
| --- | --- |
| Video Sequence | ΔT (%) |
| ArenaOfValor | 4.51 |
| ChineseDocumentEditing | 4.14 |
| scconsole | 4.52 |
| scdesktop | 4.52 |
| scflyingGraphics | 4.38 |
| BasketballDrillText | 4.19 |
| SlideEditing | 4.36 |
| SlideShow | 3.92 |
| Average | 4.32 |

It can be seen that on average, the additional encoding complexity is 4.32%. As numerous coding tools and partition methods have been adopted in VVC, the original encoding complexity is largely increased compared to HEVC. Since the pre-encoding analysis method only consists of limited operations of predictions and Hadamard transform for fixed-size coding unit, the time increase of the method of the above embodiments of the invention is tolerable. Besides, in the real-world application, the pre-encoding analysis method could be optimized by implementing with additional threads or processors, which may further reduce the computational complexity.

The video sequences used in the above embodiments are predetermined video sequences (VVC test sequences) that are usually used for coding test purposes. Some of the video sequences are available in https://jvet-experts.org/doc_end_user/current_document.php?id=10545.

System

Figure 8:
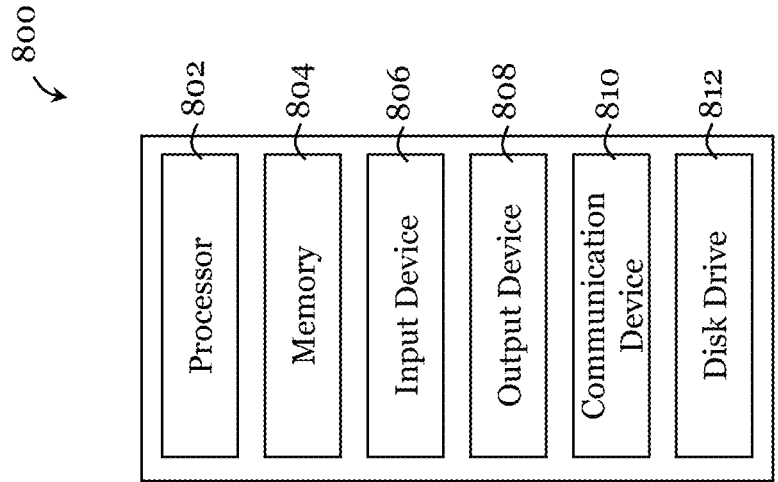
FIG. 8 is a functional block diagram of an information handling system arranged to perform at least part of a method for processing a screen content video in one embodiment.

FIG. 8 shows an example information handling system 800 that can be used as a server or another type of information processing system in one embodiment of the invention. The system 800 can be arranged or programmed to implement, partly or entirely, the methods of the invention. The information handling system 800 generally comprises suitable components necessary to receive, store, and execute appropriate computer instructions, commands, or codes. The main components of the information handling system 800 are a processor 802 and a memory (storage) 804. The processor 802 may include one or more: CPU(s), MCU(s), logic circuit(s), Raspberry Pi chip(s), digital signal processor(s)(DSP), application-specific integrated circuit(s) (ASIC), field-programmable gate array(s)(FPGA), and/or any other digital or analog circuitry/circuitries configured to interpret and/or to execute program instructions and/or to process signals and/or information and/or data (including media/video or media/video data). The memory 804 may include one or more volatile memory (such as RAM, DRAM, SRAM), one or more non-volatile memory (such as ROM, PROM, EPROM, EEPROM, FRAM, MRAM, FLASH, SSD, NAND, NVDIMM), or any of their combinations. Appropriate computer instructions, commands, codes, information and/or data may be stored in the memory 804. For example, appropriate computer instructions, commands, codes, information and/or data for implementing the method or processing of the invention may be stored partly or entirely in the memory 804. Optionally, the information handling system 800 further includes one or more input devices 806. Examples of such input device 806 include:

keyboard, mouse, stylus, image scanner, microphone, tactile/touch input device (e.g., touch sensitive screen), image/video input device (e.g., camera), etc. Optionally, the information handling system 800 further includes one or more output devices 808. Examples of such output device 808 include: display (e.g., monitor, screen, projector, etc.), speaker, disk drive, headphone, earphone, printer, additive manufacturing machine (e.g., 3D printer), etc. The display may include a LCD display, a LED/OLED display, or any other suitable display, which may or may not be touch sensitive. The display may be arranged to display media/video, media/video data, etc. The information handling system 800 may further include one or more disk drives 812 which may include one or more: solid state drive, hard disk drive, optical drive, flash drive, magnetic tape drive, etc. A suitable operating system may be installed in the information handling system 800, e.g., on the disk drive 812 or in the memory 804. The memory 804 and the disk drive 812 may be operated by the processor 802. Optionally, the information handling system 800 also includes a communication device 810 for establishing one or more communication links (not shown) with one or more other computing devices such as servers, personal computers, terminals, tablets, phones, watches, IoT devices, or other wireless or handheld computing devices. The communication device 810 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 802, the memory 804, and optionally the input device(s) 806, the output device(s) 808, the communication device(s) 810 and the disk drive(s) 812 are connected with each other through a bus, a Peripheral Component Interconnect (PCI) such as PCI Express, a Universal Serial Bus (USB), an optical bus, or other like bus structure. In one embodiment, at least some of these components may be connected through a network such as the Internet or a cloud computing network. A person skilled in the art would appreciate that the information handling system 800 shown in FIG. 8 is merely an example and that the information handling system 800 can in other embodiments have different configurations (e.g., include additional components, has fewer components, etc.)

Some of the embodiments of the invention have provided a screen content rate control scheme for the Versatile Video Coding (VVC) standard or for VVC, by exploiting the distinct characteristics of screen content videos. In some embodiments of the invention, frame-level and coding-tree-unit-level optimal bit allocations are achieved by jointly considering the RD characteristics and the temporal information of each individual frame and coding tree unit. In some embodiments of the invention, based on the complexity obtained from the pre-analysis, rate and distortion models are applied for better RD modeling. In some embodiments of the invention, the temporal importance of each frame and coding tree unit is determined by the similarities shared with future frames. As such, optimal bits are allocated and appropriate coding parameters are derived. Dome embodiments of the invention can achieve a 3.97% BDBR gain with reduced bitrate error and comparable quality fluctuation. The encoding time variation of the method of some embodiments of the invention is moderate.

In view of the critical challenges arising from the spatial and temporal unnaturalness of screen content sequences, some of the embodiments of the invention rely on the specifically designed pre-encoding analysis such that the content information regarding the scene complexity can be obtained. In some of the embodiments of the invention, the estimated residual complexity is then incorporated into the proposed complexity-aware rate models and distortion models, leading to the optimal bit allocations for each frame and coding tree unit (CTU). In some of the embodiments of the invention, the optimization problem can be analytically solved with the proposed models, and the coding parameters such as Lagrangian multiplier $\lambda$ and quantization parameter of each frame and coding tree unit could be delicately derived according to the allocated bits through the analytical models. Compared to the default hierarchical $\lambda$-domain rate control and other screen content rate control algorithms, some of the embodiments of the invention could achieve rate-distortion (RD) performance gain and bit-rate accuracy improvement.

Some of the embodiments of the invention include one or more of these features: (1) Content complexity-aware D model and R model are explored under VVC; (2) Pre-analysis method is improved with simulated the screen content coding tools; (3) Temporal importance is calculated with the statistics obtained from pre-analysis; (4) Optimal bit allocation can be achieved with the model and rate control scheme. Some of the embodiments of the invention include alternative or additional feature(s). Some of the embodiments of the invention include one or more of these advantages: (1) By consider the complexity term in the rate and distortion model, the characteristics of the encoder could be accurately estimated; (2) With the IBC prediction embedded into the pre-analysis, the screen content complexity could be accurately estimated; (3) The importance of one frame in the GOP could be obtained from the pre-analysis process; (4) optimal bit allocation can be achieved regardless the content variation; (5) better RD performance can be obtained (compared with the anchor and the state of the art methods). Some of the embodiments of the invention include alternative or additional advantage(s). Some of the embodiments of the invention facilitate compression of the video (e.g., screen content video) with less bits at the same quality. Some of the embodiments of the invention enable more bits be saved in video storage and transmission related applications. Some of the embodiments of the invention can provide, among other things, coding performance gain for screen content video.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Example optional features of some aspects of the invention are set forth in the summary section. Some embodiments of the invention may include one or more of these optional features (some of which are not specifically illustrated in the drawings). Some embodiments of the invention may lack one or more of these optional features (some of which are not specifically illustrated in the drawings). The processing methods of the invention can be performed online in substantially real time or offline. One or more features of one embodiment may be combined with one or more features of another embodiment to provide further embodiments of the invention. The system and methods of the invention can be applied to process or encode videos other than screen content videos. In some embodiments, the systems and methods of the invention can be used for Versatile Video Coding (VVC) screen content coding as well as other standard based screen content coding. In some embodiments, the systems and methods of the invention can only be used for Versatile Video Coding (VVC) screen content coding.

The invention claimed is:

1. A method for encoding a screen content video, the screen content video comprising a plurality of frames each including a plurality of coding tree units (CTUs) and a plurality of coding units in each of the coding tree units, the method comprising:

performing a coding-tree-unit-based analysis operation on the screen content video to determine content information associated with the screen content video, the content information including content complexity information and temporal importance information each associated with the screen content video, wherein the content complexity information refers to a measure of spatial characteristics of the screen content in each frame;

modelling a rate-distortion relationship of the screen content video by incorporating the content complexity information into each of a rate model and a distortion model, wherein the modelling is performed at both frame level and CTU level for each frame and each CTU, and wherein the rate model and the distortion model are two separate models each dependent on at least the content complexity and a quantization stepsize;

performing a rate control operation on the screen content video, wherein the rate control operation includes steps of performing bits allocation using a cost function incorporating the temporal importance information to weight distortion predicted by the distortion model, as well as the rate model and the distortion model to estimate rate and distortion for optimization of the bits allocation, wherein the temporal importance information represents a measure of distortion impact of a coding unit, a coding tree unit, or a frame on a total distortion of a group of pictures, derived recursively through propagation of distortion based on inter-frame prediction and intra block copy prediction; and and deriving coding parameters according to allocated bits resulting from the bits allocation step.

2. The method of claim 1, wherein the content complexity information associated with the screen content video comprises content complexity measures for each of the coding units; and wherein the temporal importance information comprises temporal importance measures for each of the coding units.

3. The method of claim 2, wherein the coding-tree-unit-based analysis operation comprises:

processing the screen content video to perform inter prediction, intra prediction, and intra block copy prediction.

4. The method of claim 3, wherein the coding-tree-unit-based analysis operation comprises:

determining the content complexity measures based on Hadamard transform of residuals of the intra prediction, the inter prediction, and/or the intra block copy prediction.

5. The method of claim 4, wherein the content complexity measures are based on:

$$C = \frac{\sum_k |HAD_k|}{W \cdot H}$$

Where C denotes a content complexity measure, $HAD_k$ denotes a sample of Hadamard-transformed prediction residual at position k within a coding unit, W and H are width and height of a corresponding one of the frame.

6. The method of claim 4, wherein the coding-tree-unit-based analysis operation comprises:

determining the temporal importance measures based on the recursive propagation process takes into account the content complexity measures associated with the coding units.

7. The method of claim 2, wherein each of the content complexity measures is determined by a sum of absolute transformed difference (SATD).

8. The method of claim 1, wherein the rate and distortion model comprises one or more rate models and one or more distortion models.

9. The method of claim 8, wherein each of the one or more rate models is modelled based on $R = \alpha \cdot C^\beta \cdot QS^\gamma$, where R is rate, C is content complexity measure, QS is quantization stepsize, and $\alpha$, $\beta$, $\gamma$ are model parameters; and wherein each of the one or more distortion models is modelled based on $D = \mu \cdot C^\eta \cdot QS^\epsilon$, where D is distortion, C is content complexity measure, QS is quantization stepsize, and $\mu$, $\eta$, $\epsilon$ are model parameters.

10. The method of claim 9, wherein the bits allocation step comprises:

group-of-pictures-level bit allocation;

frame-level bit allocation; and coding-tree-unit-level bit allocation.

11. The method of claim 10, wherein the rate control operation further comprises:

determining the coding parameters associated with each of the frames based on the allocated bits obtained in the frame-level bit allocation and the rate and distortion models; and determining the coding parameters associated with each of the coding tree units based on the allocated bits obtained in the coding-tree-unit-level bit allocation and the rate and distortion models.

12. The method of claim 11, wherein the coding parameters associated with each of the frames comprise quantization parameters and Lagrangian multipliers $\lambda$ associated with each of the frames; and wherein the coding parameters associated with each of the coding tree units comprise quantization parameters and Lagrangian multipliers $\lambda$ associated with each of the coding tree units.

13. The method of claim 12, wherein the Lagrangian multipliers $\lambda$ associated with each of the frames are determined based on $$\lambda = x \cdot C^y QS^z, \text{ where } x = -\frac{\mu\epsilon}{\alpha\gamma}, y = \eta - \beta, z = \epsilon - \gamma.$$

14. The method of claim 12, wherein the Lagrangian multipliers $\lambda$ associated with each of the coding tree units are determined based on $$\lambda = x \cdot C^y QS^z, \text{ where } x = -\frac{\mu\epsilon}{\alpha\gamma}, y = \eta - \beta, z = \epsilon - \gamma.$$

15. The method of claim 8, wherein the one or more rate models comprise a frame-level rate model and a coding-tree-unit-level rate model; and wherein the one or more distortion models comprises a frame-level distortion model, and a coding-tree-unit-level distortion model.

16. The method of claim 15, wherein the frame-level rate model and the coding-tree-unit-level rate model are each modelled based on $R = \alpha \cdot C^\beta \cdot QS^\gamma$, where R is rate, C is content complexity measure, QS is quantization stepsize, and $\alpha$, $\beta$, $\gamma$ are model parameters; and wherein the frame-level distortion model and the coding-tree-unit-level distortion model are each modelled based on $D = \mu \cdot C^\eta \cdot QS^\epsilon$, where D is distortion, C is content complexity measure, QS is quantization stepsize, and $\mu$, $\eta$, $\epsilon$ are model parameters.

17. The method of claim 9, further comprising: encoding each of the frames and/or each of the coding tree units of the screen content video based on the rate control operation to facilitate generation of a bitstream of the screen content video.

18. The method of claim 17, further comprising: updating the model parameters in the rate and distortion models after encoding of each of the frames and/or each of the coding tree units.

19. The method of claim 1, comprising a further step of incorporating screen content coding tools in the coding-tree-unit-based analysis operation.

20. The method of claim 19, wherein the screen content coding tools are selected from any one of intra block copy (IBC), palette mode, adaptive color Transform (ACT), transform skip with residual coding (TSRC), block-based differential pulse-coded modulation (BDPCM), or a combination thereof.

21. A system for encoding a screen content video, the screen content video comprising a plurality of frames each including a plurality of coding tree units and a plurality of coding units in each of the coding tree units, the system comprising:

one or more processors; and memory storing one or more programs configured to be executed by the one or more processors, the one or more programs including instructions for:

performing a coding-tree-unit-based analysis operation on the screen content video to determine content information associated with the screen content video, the content information including content complexity information and temporal importance information each associated with the screen content video, wherein the content complexity information refers to a measure of spatial characteristics of the screen content in each frame;

modelling a rate-distortion relationship of the screen content video by incorporating the content complexity information into each of a rate model and a distortion model, wherein the modelling is performed at both frame level and CTU level for each frame and each CTU, and wherein the rate model and the distortion model are two separate models each dependent on at least the content complexity and a quantization step-size;

performing a rate control operation on the screen content video, wherein the rate control operation includes steps of performing bits allocation using a cost function incorporating the temporal importance information to weight distortion predicted by the distortion model, as well as the rate model and the distortion model to estimate rate and distortion for optimization, wherein the temporal importance information represents a measure of distortion impact of a coding unit, a coding tree unit, or a frame on a total distortion of a group of pictures, derived recursively through propagation of distortion based on inter-frame prediction and intra block copy prediction; and deriving coding parameters according to allocated bits resulted from the bits allocation step.

22. A non-transitory computer-readable storage medium storing one or more programs configured to be executed by one or more processors, the one or more programs including instructions for encoding a screen content video, wherein the screen content video comprises a plurality of frames each including a plurality of coding tree units and a plurality of coding units in each of the coding tree units, and wherein the instructions for processing a screen content video comprise instructions for:

performing a coding-tree-unit-based analysis operation on the screen content video to determine content information associated with the screen content video, the content information including content complexity information and temporal importance information each associated with the screen content video, wherein the content complexity information refers to a measure of spatial characteristics of the screen content in each frame;

modelling a rate-distortion relationship of the screen content video by incorporating the content complexity information into each of a rate model and a distortion model, wherein the modelling is performed at both frame level and CTU level for each frame and each CTU, and wherein the rate model and the distortion model are two separate models each dependent on at least the content complexity and a quantization step-size;

performing a rate control operation on the screen content video, wherein the rate control operation includes steps of performing bits allocation using a cost function incorporating the temporal importance information to weight distortion predicted by the distortion model, as well as the rate model and the distortion model to estimate rate and distortion for optimization of the bits allocation, wherein the temporal importance information represents a measure of distortion impact of a coding unit, a coding tree unit, or a frame on a total distortion of a group of pictures, derived recursively through propagation of distortion based on inter-frame prediction and intra block copy prediction; and deriving coding parameters according to allocated bits resulted from the bits allocation step.

\* \* \* \* \*